US008665146B2

(12) United States Patent
Takeichi et al.

(10) Patent No.: US 8,665,146 B2
(45) Date of Patent: Mar. 4, 2014

(54) CALCULATION METHOD OF THE AMOUNT OF ZENITH TROPOSPHERE DELAY, AND A CORRECTING METHOD OF TROPOSPHERE DELAY OF SATELLITE POSITIONING SIGNAL

(75) Inventors: Noboru Takeichi, Chofu (JP); Takeyasu Sakai, Chofu (JP); Sounosuke Fukushima, Chofu (JP); Ken Ito, Chofu (JP)

(73) Assignee: Electronic Navigation Research Institute, Tokyo (JP)

( * ) Notice: Subject to any disclaimer, the term of this patent is extended or adjusted under 35 U.S.C. 154(b) by 713 days.

(21) Appl. No.: 12/668,355

(22) PCT Filed: Dec. 28, 2007

(86) PCT No.: PCT/JP2007/075312
§ 371 (c)(1),
(2), (4) Date: Jan. 8, 2010

(87) PCT Pub. No.: WO2009/008104
PCT Pub. Date: Jan. 15, 2009

(65) Prior Publication Data
US 2010/0194639 A1    Aug. 5, 2010

(30) Foreign Application Priority Data
Jul. 10, 2007  (JP) ................... 2007-181270

(51) Int. Cl.
G01S 19/07  (2010.01)
G01S 19/21  (2010.01)
(52) U.S. Cl.
USPC ................... 342/357.44; 342/357.59
(58) Field of Classification Search
USPC ................... 342/357.44, 357.59
See application file for complete search history.

(56) References Cited

U.S. PATENT DOCUMENTS 5,764,184 A * 6/1998 Hatch et al. ............... 342/357.44
2007/0247361 A1* 10/2007 Shoarinejad ............. 342/357.09

FOREIGN PATENT DOCUMENTS

JP        2006-523836         10/2006
WO    WO 2004/095055 A1 *  11/2004

OTHER PUBLICATIONS

N. Takeichi et al., Tropospheric Delay Correction for the Augmentation System using Quasi-Zenith Satellite System, IEICE Tech. Rep., vol. 107(2), p. 13-18, Apr. 2007.*
N. Takeichi et al., Tropospheric Delay Correction in L1-SAIF Augmentation, International Global Navigation Satellite Systems Society IGNSS Symposium, Dec. 2007.*
Takeichi, Noboru et al., "Juntencho Eisei o Mochiita Koseido Sukui Hosei ni Okeru Tairyuken Chien Hosei Hoshiki," IEICE Technical Report, Jan. 12, 2007, pp. 81-86, vol. 106—No. 471.
Zheng, "Interpolating Residual Zenith Tropospheric Delays for Improved Wide Area Differential GPS Positioning," ION GNSS, 2004, pp. 915-924.
Jupp, "Use of Numerical Weather Prediction Fields for the Improvement of Tropospheric Corrections in Global Positioning Applications," ION GPS, 2003, pp. 377-389.

* cited by examiner

*Primary Examiner* — Jack W Keith
*Assistant Examiner* — Fred H Mull
(74) *Attorney, Agent, or Firm* — Muncy, Geissler, Olds & Lowe, PLLC

(57)  ABSTRACT

This invention relates to the troposphere delay produced when the electromagnetic waves from a satellite or astronomical body pass through the troposphere, in particular, it is related to a calculation method of an estimated value of the amount of zenith troposphere delay in real time, and troposphere delay of the satellite positioning signal in the case of positioning using the estimated value of this calculated amount of zenith troposphere delay is related with a correcting method.

13 Claims, 7 Drawing Sheets

(the upper side: Electronic reference point 93019,
the lower side: IGS obserbation point kgni)

| Preamble (8bit) | Messe Type (6bit) | Data (212bit) | Parity (24bit) |

CALCULATION METHOD OF THE AMOUNT OF ZENITH TROPOSPHERE DELAY, AND A CORRECTING METHOD OF TROPOSPHERE DELAY OF SATELLITE POSITIONING SIGNAL

FIELD OF THE INVENTION

This invention relates to the troposphere delay produced when the electromagnetic waves from a satellite or astronomical body pass through the troposphere. Especially this invention relates to the method of calculating the amount of zenith troposphere delay on real time, and the method of correcting troposphere delay of the satellite positioning signal when positioning using this calculated amount of zenith troposphere delay.

BACKGROUND OF THE INVENTION

Generally, the electromagnetic waves (it is hereafter described as a signal) emitted from a satellite or astronomical body pass through the ionosphere and the troposphere, in order to reach on the ground. When a signal passes through the ionosphere and the troposphere, delay of a signal occurs. These delays are called ionosphere delay and troposphere delay, respectively. Therefore, when using this signal as a positioning signal, these ionosphere delay and troposphere delay are one of the sources of a positioning error.

Since the amount of ionosphere delay in the ionosphere changes with frequency, it can calculate the amount of ionosphere delay by receiving the signal of two frequencies. On the other hand, since the amount of troposphere delay in the troposphere changes with temperature, atmospheric pressures, atmospheric steam, etc., it not only always changes with a season or time, but it changes a lot locally at the time of passage of a typhoon or the cold front.

However, the amount of troposphere delay cannot be measured directly. Thus, the amount of troposphere delay is changed according to a weather condition or geographical conditions. Therefore, also in time and in space, the amount of troposphere delay has a large change.

In the positioning of a movable body, in order to correct the amount of troposphere delay, the correction information of the amount of troposphere delay which can be applied to real time at optional points is indispensable. Therefore, generally, by the positioning of the movable body, the amount of zenith troposphere delay is modeled as a function of only altitude, and is used. And in SBAS, the model of the amount of zenith troposphere delay to which the correction of a positioning signal is called a MOPS model is used. This MOPS model is a function of the date, the Latitude and altitude.

The MOPS model is the abbreviation for Minimum Operational Performance Standards for Global Positioning System. And the MOPS model is a function of the amount of zenith troposphere delay defined by the following SBAS agreement document.

"RTCA: Minimum Operational Performance Standerds for Global Positioning System/Wide Area Augmentation System Aorborne Equipment, RTCA/DO-229C, 2001."

The SBAS is a global positioning system reinforcement system (Satellite Based Augmentation System: describes it as SBAS.) which is a system for making the conventional positioning accuracy improve. This SBAS aims at correcting a satellite orbit, a satellite clock, and the source of a positioning error of ionosphere delay with high precision.

In two or more aeronautical stations installed in the known datum point, distance of the aeronautical station and the navigation satellite measured with the positioning signal from a navigation satellite, the error of the distance obtained from the position information on a navigation satellite and the position information on an aeronautical station is transmitted to a geostationary satellite as correction information, and these correction information is transmitted to the user from the geostationary satellite.

A user receives this correction information. Subsequently, by this correction information, the user corrected the error included in the positioning signal from a satellite, and has improved positioning accuracy.

[Patent documents 1]: JP,2003-114270,A

DESCRIPTION OF THE INVENTION

Problem(s) to be Solved by the Invention

However, under the present circumstances, a satellite orbit and a satellite clock, ionosphere delay, and troposphere delay serve as an almost equivalent source of a positioning error. So, in SBAS, the amount of troposphere delay is estimated first.

Subsequently, a weather condition assumes average weather as a means for using this amount of troposphere delay. As geographical conditions, the MOPS model which is a function of the date, the Latitude, and altitude is used. This MOPS model is a model only in consideration of geographical conditions. As a model which is not taking the weather condition into consideration, it is said that this MOPS model is the highest-precision model. And positioning error $\sigma$ of this MOPS model is set to $\sigma=12$ cm in the direction of the zenith.

If the elevation angle of a GPS Satellite becomes narrow, the distance in which a GPS signal passes through the troposphere will become long. So, it is thought that an correction error will be several or more times the direction of the zenith. In order to realize highly precise positioning accuracy, it is necessary to correct the amount of troposphere delay to high precision conventionally.

At optional positioning points, when the GPS signal from the GPS Satellite located in the direction of the zenith passes through the troposphere, troposphere delay occurs. The amount of this troposphere delay is indicated to be the amount of zenith troposphere delay. And when the GPS signal from the GPS Satellite located in optional elevation angles $\alpha$ passes through the troposphere, troposphere delay occurs. The amount of this troposphere delay is indicated to be the amount of troposphere delay. Therefore, the following formula is realized.

$$\text{The amount of zenith troposphere delay} = \text{The amount of troposphere delay} * \sin \alpha$$

Thus, in SBAS, the amount of troposphere delay changed according to geographical conditions using a MOPS model can be estimated. However, in SBAS, since the amount of troposphere delay is changed according to a weather condition, the amount of troposphere delay has the problem that it cannot improve enough, and it waits for the highly precise positioning accuracy of the amount of troposphere delay.

As described above, the amount of troposphere delay is changed according to a weather condition and geographical conditions. Therefore, also in time and in space, change of the amount of troposphere delay is big. Therefore, in order to realize highly precise positioning accuracy, the correction information for correcting the amount of troposphere delay with high precision in time and in space is necessary.

Then, if the correction information of the amount of troposphere delay can be transmitted to a user, in positioning calculation, high precision positioning is realizable in the user side by using this correction information for the correction of a positioning signal.

Then, the inventors found out the method of calculating the amount of zenith troposphere delay which can realize positioning accuracy exceeding the conventional SBAS. That is, if the amount of zenith troposphere delay in a user point is calculated, the correction information of the accuracy exceeding the model of the amount of delay used by the conventional SBAS can be made, when mounted to the system using Quasi-Zenith Satellite, the transmission of the message for an correction can transmit correction information sufficient by about 3 times.

The inventors found out the method of correcting the calculated amount of zenith troposphere delay and troposphere delay of the satellite positioning signal obtained from the satellite.

Means for Solving the Problem

The present invention provides a calculation method of an estimated value of the amount of zenith troposphere delay comprised from:

two or more amendment areas which satisfy the same weather condition in a service area is set up by an entrepreneur, in this amendment area, point A and at least one reference point B which offers the correction information of the amount of zenith troposphere delay are set up, the estimated value $ZTD_B$ of the amount of zenith troposphere delay in this reference point B is calculated, the information about the correction value of the amount of zenith troposphere delay in reference point B is transmitted to point A (user point) in amendment area, the information about the correction value of the amount of zenith troposphere delay in reference point B is obtained by the user located in point A (user point), the difference of the amount of zenith troposphere delay by the geographical conditions in point A and reference point B is calculated using model function $f_{ZTD}(A)$ of the amount of zenith troposphere delay in point A, and model function $f_{ZTD}(B)$ of the amount of zenith troposphere delay in reference point B, respectively, subsequently, obtained estimated value $ZTD_B$ of the amount of zenith troposphere delay in reference point B is corrected by the difference of the amount of zenith troposphere delay by geographical conditions with point A and reference point B, the estimated value $ZTD_A$ of the amount of zenith troposphere delay in point A is calculated by this corrected estimated value $ZTD_B$ of the amount of zenith troposphere delay in reference point B.

The present invention also provides the calculation method of an estimated value of the amount of zenith troposphere delay comprised from:

two or more amendment areas which satisfy the same weather condition in a service area is set up by an entrepreneur, in this amendment area, point A and at least one reference point B which offers the correction information of the amount of zenith troposphere delay are set up, the estimated value $ZTD_B$ of the amount of zenith troposphere delay in this reference point B is calculated, the difference of the estimated value of the amount of zenith troposphere delay in reference point B and the model function $f_{ZTD}(B)$ of the amount of zenith troposphere delay in reference point B are calculated, subsequently, the difference of the estimated value of the amount of zenith troposphere delay in reference point B and the model function $f_{ZTD}(B)$ are transmitted to point A (user point) in the amendment area as correction information for calculating the estimated value of the amount of zenith troposphere delay in point A, correction information are obtained by the user located in point A (user point), model function $f_{ZTD}(A)$ of the amount of zenith troposphere delay in point A is corrected by this obtained correction information, the estimated value $ZTD_A$ of the amount of zenith troposphere delay in point A is calculated by this corrected model function $f_{ZTD}(A)$ of the amount of zenith troposphere delay in point A.

The present invention also provides the calculation method of an estimated value of the amount of zenith troposphere delay comprised from:

two or more amendment areas which satisfy the same weather condition in a service area is set up by an entrepreneur, in this amendment area, point A and at least one reference point B which offers the correction information of the amount of zenith troposphere delay are set up, the estimated value $ZTD_B$ of the amount of zenith troposphere delay in this reference point B is calculated, the information about the correction value of the amount of zenith troposphere delay in reference point B is transmitted to point A (user point) in the amendment area, the information about the correction value of the amount of zenith troposphere delay in reference point B is obtained by the user located in point A (user point), the difference of the amount of zenith troposphere delay by the geographical conditions in point A and reference point B is calculated using model function $f_{ZTD}(A)$ of the amount of zenith troposphere delay in point A, and model function $f_{ZTD}(B)$ of the amount of zenith troposphere delay in reference point B, respectively, subsequently, obtained estimated value $ZTD_B$ of the amount of zenith troposphere delay in reference point B is corrected by the difference of the amount of zenith troposphere delay by geographical conditions with point A and reference point B, the estimated value $ZTD_A$ of the amount of zenith troposphere delay in point A is calculated by this corrected estimated value $ZTD_B$ of the amount of zenith troposphere delay in reference point B, the estimated value of the amount of zenith troposphere delay in each reference point B is calculated in the analysis of a satellite positioning signal.

The present invention also provides the calculation method of an estimated value of the amount of zenith troposphere delay comprised from:

two or more amendment areas which satisfy the same weather condition in a service area is set up by an entrepreneur, in this amendment area, point A and at least one reference point B which offers the correction information of the amount of zenith troposphere delay are set up, the estimated value $ZTD_B$ of the amount of zenith troposphere delay in this reference point B is calculated, the difference of the estimated value of the amount of zenith troposphere delay in reference point B and the model function $f_{ZTD}(B)$ of the amount of zenith troposphere delay in reference point B are calculated, subsequently, the difference of the estimated value of the amount of zenith troposphere delay in reference point B and the model function $f_{ZTD}(B)$ are transmitted to point A (user point) in the amendment area as correction information for calculating the estimated value of the amount of zenith troposphere delay in point A, correction information are obtained by the user located in point A (user point), model function $f_{ZTD}(A)$ of the amount of zenith troposphere delay in point A is corrected by this obtained correction information, the estimated value $ZTD_A$ of the amount of zenith troposphere delay in point A is calculated by this corrected model function $f_{ZTD}(A)$ of the amount of zenith troposphere delay in point A, the estimated value of the amount of zenith troposphere delay in each reference point B is calculated in the analysis of a satellite positioning signal.

The present invention also provides the calculation method of an estimated value of the amount of zenith troposphere delay comprised from:

two or more amendment areas which satisfy the same weather condition in a service area is set up by an entrepreneur, in this amendment area, point A and at least one reference point B which offers the correction information of the amount of zenith troposphere delay are set up, the estimated value $ZTD_B$ of the amount of zenith troposphere delay in this reference point B is calculated, the information about the correction value of the amount of zenith troposphere delay in reference point B is transmitted to point A (user point) in the amendment area via a satellite, the information about the correction value of the amount of zenith troposphere delay in reference point B is obtained by the user located in point A (user point) via a satellite, the difference of the amount of zenith troposphere delay by the geographical conditions in point A and reference point B is calculated using model function $f_{ZTD}(A)$ of the amount of zenith troposphere delay in point A, and model function $f_{ZTD}(B)$ of the amount of zenith troposphere delay in reference point B, respectively, subsequently, obtained estimated value $ZTD_B$ of the amount of zenith troposphere delay in reference point B is corrected by the difference of the amount of zenith troposphere delay by geographical conditions with point A and reference point B, the estimated value $ZTD_A$ of the amount of zenith troposphere delay in point A is calculated by this corrected estimated value $ZTD_B$ of the amount of zenith troposphere delay in reference point B.

The present invention also provides the calculation method of an estimated value of the amount of zenith troposphere delay comprised from:

two or more amendment areas which satisfy the same weather condition in a service area is set up by an entrepreneur, in this amendment area, point A and at least one reference point B which offers the correction information of the amount of zenith troposphere delay are set up, the estimated value $ZTD_B$ of the amount of zenith troposphere delay in this reference point B is calculated, the difference of the estimated value of the amount of zenith troposphere delay in reference point B and the model function $f_{ZTD}(B)$ of the amount of zenith troposphere delay in reference point B are calculated, subsequently, the difference of the estimated value of the amount of zenith troposphere delay in reference point B and the model function $f_{ZTD}(B)$ are transmitted to point A (user point) in the amendment area as correction information for calculating the estimated value of the amount of zenith troposphere delay in point A via a satellite, correction information are obtained by the user located in point A (user point) via a satellite, model function $f_{ZTD}(A)$ of the amount of zenith troposphere delay in point A is corrected by this obtained correction information, the estimated value $ZTD_A$ of the amount of zenith troposphere delay in point A is calculated by this corrected model function $f_{ZTD}(A)$ of the amount of zenith troposphere delay in point A.

In the calculation method of an estimated value of the amount of zenith troposphere delay, the present invention also provides the calculation method of an estimated value of the amount of zenith troposphere delay comprised from:

when two or more reference points B are installed, estimated value $ZTD_B$ of the amount of zenith troposphere delay in each reference point B is calculated, respectively, about two or more of these calculated estimated value of the amount of zenith troposphere delay, weight attachment is performed by the weight attachment function which consists of the distance and altitude difference of point A and each reference point B, subsequently, the one amount of zenith troposphere delay is calculated by interpolating.

In a calculation method of an estimated value of the amount of zenith troposphere delay according to the present invention, the calculation method of an estimated value of the amount of zenith troposphere delay is also comprised from:

into the message transmitted at once, as much estimated values or correction information of the amount of zenith troposphere delay of reference point B as possible are distributed equally and geographically, and are transmitted.

The present invention provides a correcting method of troposphere delay of a satellite positioning signal comprised from:

two or more amendment areas which satisfy the same weather condition in a service area is set up by an entrepreneur, in this amendment area, point A and at least one reference point B which offers the correction information of the amount of zenith troposphere delay are set up, the estimated value $ZTD_B$ of the amount of zenith troposphere delay in this reference point B is calculated, the information about the correction value of the amount of zenith troposphere delay in reference point B is transmitted to point A (user point) in the amendment area, the estimated value of the amount of zenith troposphere delay in reference point B is obtained by the user located in point A (user point), the difference of the amount of zenith troposphere delay by the geographical conditions in point A and reference point B is calculated using model function $f_{ZTD}(A)$ of the amount of zenith troposphere delay in point A, and model function $f_{ZTD}(B)$ of the amount of zenith troposphere delay in reference point B, respectively, subsequently, obtained estimated value $ZTD_B$ of the amount of zenith troposphere delay in reference point B is corrected by the difference of the amount of zenith troposphere delay by geographical conditions with point A and reference point B, the estimated value $ZTD_A$ of the amount of zenith troposphere delay in point A is calculated by this corrected estimated value $ZTD_B$ of the amount of zenith troposphere delay in reference point B, the satellite positioning signal from a satellite is received by the user, and the elevation angle of this received the satellite positioning signal is calculated, the amount of troposphere delay of the satellite positioning signal is calculated with the mapping function for calculating the amount of troposphere delay of a satellite positioning signal from the amount of zenith troposphere delay which makes a parameter this elevation angle of this satellite positioning signal, and the estimated value $ZTD_A$ of the amount of zenith troposphere delay in point A, troposphere delay of a satellite positioning signal is corrected by this amount of troposphere delay of the satellite positioning signal.

The present invention provides a correcting method of troposphere delay of a satellite positioning signal comprised from:

two or more amendment areas which satisfy the same weather condition in a service area is set up by an entrepreneur, in this amendment area, point A and at least one reference point B which offers the correction information of the amount of zenith troposphere delay are set up, the estimated value $ZTD_B$ of the amount of zenith troposphere delay in this reference point B is calculated, the difference of the estimated value of the amount of zenith troposphere delay in reference point B and the model function $f_{ZTD}(B)$ of the amount of zenith troposphere delay in reference point B are calculated, subsequently, the difference of the estimated value of the amount of zenith troposphere delay in reference point B and the model function $f_{ZTD}(B)$ are transmitted to point A (user point) in the amendment area as correction information for calculating the estimated value of the amount of zenith troposphere delay in point A, correction information are obtained by the user located in point A (user point), model function $f_{ZTD}(A)$ of the amount of zenith troposphere delay in point A is corrected by this obtained correction information, the estimated value $ZTD_A$ of the amount of zenith troposphere delay in point A is calculated by this corrected model function $f_{ZTD}(A)$ of the amount of zenith troposphere delay in point A, the satellite positioning signal from a satellite is received by the user, and the elevation angle of this received the satellite positioning signal is calculated, the amount of troposphere delay of the satellite positioning signal is calculated with the mapping function for calculating the amount of troposphere delay of a satellite positioning signal from the amount of zenith troposphere delay which makes a parameter this elevation angle of this satellite positioning signal, and the estimated value $ZTD_A$ of the amount of zenith troposphere delay in point A, troposphere delay of a satellite positioning signal is corrected by this amount of troposphere delay of the satellite positioning signal.

In a correcting method of troposphere delay of a satellite positioning signal according to the present invention, a correcting method of troposphere delay of a satellite positioning signal is also comprised from:

when two or more reference points B are installed, estimated value $ZTD_B$ of the amount of zenith troposphere delay in each reference point B is calculated, respectively, about two or more of these calculated estimated value of the amount of zenith troposphere delay, weight attachment is performed by the weight attachment function which consists of the distance and altitude difference of point A and each reference point B, subsequently, the one amount of zenith troposphere delay is calculated by interpolating.

The present invention provides a correcting method of troposphere delay of a satellite positioning signal comprised from:

two or more amendment areas which satisfy the same weather condition in a service area is set up by an entrepreneur, in this amendment area, point A and at least one reference point B which offers the correction information of the amount of zenith troposphere delay are set up, the estimated value $ZTD_B$ of the amount of zenith troposphere delay in this reference point B is calculated, the information about the correction value of the amount of zenith troposphere delay in reference point B is transmitted to point A (user point) in the amendment area via a satellite, the estimated value of the amount of zenith troposphere delay in reference point B is obtained by the user located in point A (user point) via a satellite, the difference of the amount of zenith troposphere delay by the geographical conditions in point A and reference point B is calculated using model function $f_{ZTD}(A)$ of the amount of zenith troposphere delay in point A, and model function $f_{ZTD}(B)$ of the amount of zenith troposphere delay in reference point B, respectively, subsequently, obtained estimated value $ZTD_B$ of the amount of zenith troposphere delay in reference point B is corrected by the difference of the amount of zenith troposphere delay by geographical conditions with point A and reference point B, the estimated value $ZTD_A$ of the amount of zenith troposphere delay in point A is calculated by this corrected estimated value $ZTD_B$ of the amount of zenith troposphere delay in reference point B, the satellite positioning signal from a satellite is received by the user, and the elevation angle of this received the satellite positioning signal is calculated, the amount of troposphere delay of the satellite positioning signal is calculated with the mapping function for calculating the amount of troposphere delay of a satellite positioning signal from the amount of zenith troposphere delay which makes a parameter this elevation angle of this satellite positioning signal, and the estimated value $ZTD_A$ of the amount of zenith troposphere delay in point A, troposphere delay of a satellite positioning signal is corrected by this amount of troposphere delay of the satellite positioning signal.

The present invention provides a method of correcting troposphere delay of the satellite positioning signal characterized by the following thing.

An entrepreneur sets up two or more amendment areas which satisfy the same weather condition in a self service area, in this amendment area, point A and at least one reference point B which offers the correction information of the amount of zenith troposphere delay are set up, estimated value $ZTD_B$ of the amount of zenith troposphere delay in this reference point B is calculated, about reference point B, the difference of the estimated value of this amount of zenith troposphere delay and the model function $f_{ZTD}(B)$ of the amount of zenith troposphere delay are calculated, as correction information for calculating the estimated value of the amount of zenith troposphere delay in point A, the difference of the estimated value of the amount of zenith troposphere delay and model function $f_{ZTD}(B)$ of the amount of zenith troposphere delay are transmitted to point A (user point) of the amendment area via a satellite, the user located in point A (user point) obtains this correction information via a satellite, this obtained correction information corrects model function $f_{ZTD}(A)$ of the amount of zenith troposphere delay in point A, subsequently, estimated value $ZTD_A$ of the amount of zenith troposphere delay in point A is calculated, a user receives the satellite positioning signal from a satellite, and the received elevation angle of a satellite positioning signal is calculated, as a function which makes a parameter the elevation angle of this satellite positioning signal, the amount of troposphere delay of a satellite positioning signal is calculated with the mapping function for calculating the amount of troposphere delay of a satellite positioning signal from the amount of zenith troposphere delay, and estimated value $ZTD_A$ of the amount of zenith troposphere delay in point A, the amount of troposphere delay of this satellite positioning signal corrects troposphere delay of a satellite positioning signal.

The present invention provides a correcting method of troposphere delay of a satellite positioning signal comprised from:

two or more amendment areas which satisfy the same weather condition in a service area is set up by an entrepreneur, in this amendment area, point A and at least one reference point B which offers the correction information of the amount of zenith troposphere delay are set up, the estimated value $ZTD_B$ of the amount of zenith troposphere delay in this reference point B is calculated, the information about the correction value of the amount of zenith troposphere delay in reference point B is transmitted to point A (user point) in the amendment area via a satellite, the estimated value of the amount of zenith troposphere delay in reference point B is obtained by the user located in point A (user point) via a satellite, the difference of the amount of zenith troposphere delay by the geographical conditions in point A and reference point B is calculated using model function $f_{ZTD}(A)$ of the amount of zenith troposphere delay in point A, and model function $f_{ZTD}(B)$ of the amount of zenith troposphere delay in reference point B, respectively, subsequently, obtained estimated value $ZTD_B$ of the amount of zenith troposphere delay in reference point B is corrected by the difference of the amount of zenith troposphere delay by geographical conditions with point A and reference point B, the estimated value $ZTD_A$ of the amount of zenith troposphere delay in point A is calculated by this corrected estimated value $ZTD_B$ of the amount of zenith troposphere delay in reference point B, the satellite positioning signal from a satellite is received by the user, and the elevation angle of this received the satellite positioning signal is calculated, the amount of troposphere delay of the satellite positioning signal is calculated with the mapping function for calculating the amount of troposphere delay of a satellite positioning signal from the amount of zenith troposphere delay which makes a parameter this elevation angle of this satellite positioning signal, and the estimated value $ZTD_A$ of the amount of zenith troposphere delay in point A, troposphere delay of a satellite positioning signal is corrected by this amount of troposphere delay of the satellite positioning signal, when two or more reference points B are installed, estimated value $ZTD_B$ of the amount of zenith troposphere delay in each reference point B is calculated, respectively, about two or more of these calculated estimated value of the amount of zenith troposphere delay, weight attachment is performed by the weight attachment function which consists of the distance and altitude difference of point A and each reference point B, subsequently, the one amount of zenith troposphere delay is calculated by interpolating.

The present invention provides a correcting method of troposphere delay of a satellite positioning signal comprised from:

two or more amendment areas which satisfy the same weather condition in a service area is set up by an entrepreneur, in this amendment area, point A and at least one reference point B which offers the correction information of the amount of zenith troposphere delay are set up, the estimated value $ZTD_B$ of the amount of zenith troposphere delay in this reference point B is calculated, the difference of the estimated value of the amount of zenith troposphere delay in reference point B and the model function $f_{ZTD}(B)$ of the amount of zenith troposphere delay in reference point B are calculated, subsequently, the difference of the estimated value of the amount of zenith troposphere delay in reference point B and the model function $f_{ZTD}(B)$ are transmitted to point A (user point) in the amendment area as correction information for calculating the estimated value of the amount of zenith troposphere delay in point A via a satellite, correction information are obtained by the user located in point A (user point) via a satellite, model function $f_{ZTD}(A)$ of the amount of zenith troposphere delay in point A is corrected by this obtained correction information, the estimated value $ZTD_A$ of the amount of zenith troposphere delay in point A is calculated by this corrected model function $f_{ZTD}(A)$ of the amount of zenith troposphere delay in point A, the satellite positioning signal from a satellite is received by the user, and the elevation angle of this received the satellite positioning signal is calculated, the amount of troposphere delay of the satellite positioning signal is calculated with the mapping function for calculating the amount of troposphere delay of a satellite positioning signal from the amount of zenith troposphere delay which makes a parameter this elevation angle of this satellite positioning signal, and the estimated value $ZTD_A$ of the amount of zenith troposphere delay in point A, troposphere delay of a satellite positioning signal is corrected by this amount of troposphere delay of the satellite positioning signal, when two or more reference points B are installed, estimated value $ZTD_B$ of the amount of zenith troposphere delay in each reference point B is calculated, respectively, about two or more of these calculated estimated value of the amount of zenith troposphere delay, weight attachment is performed by the weight attachment function which consists of the distance and altitude difference of point A and each reference point B, subsequently, the one amount of zenith troposphere delay is calculated by interpolating.

The present invention provides a correcting method of troposphere delay of a satellite positioning signal comprised from:

two or more amendment areas which satisfy the same weather condition in a service area is set up by an entrepreneur, in this amendment area, point A and at least one reference point B which offers the correction information of the amount of zenith troposphere delay are set up, the estimated value $ZTD_B$ of the amount of zenith troposphere delay in this reference point B is calculated, the information about the correction value of the amount of zenith troposphere delay in reference point B is transmitted to point A (user point) in the amendment area via a satellite, the estimated value of the amount of zenith troposphere delay in reference point B is obtained by the user located in point A (user point) via a satellite, the difference of the amount of zenith troposphere delay by the geographical conditions in point A and reference point B is calculated using model function $f_{ZTD}(A)$ of the amount of zenith troposphere delay in point A, and model function $f_{ZTD}(B)$ of the amount of zenith troposphere delay in reference point B, respectively, subsequently, obtained estimated value $ZTD_B$ of the amount of zenith troposphere delay in reference point B is corrected by the difference of the amount of zenith troposphere delay by geographical conditions with point A and reference point B, the estimated value $ZTD_A$ of the amount of zenith troposphere delay in point A is calculated by this corrected estimated value $ZTD_B$ of the amount of zenith troposphere delay in reference point B, the satellite positioning signal from a satellite is received by the user, and the elevation angle of this received the satellite positioning signal is calculated, the amount of troposphere delay of the satellite positioning signal is calculated with the mapping function for calculating the amount of troposphere delay of a satellite positioning signal from the amount of zenith troposphere delay which makes a parameter this elevation angle of this satellite positioning signal, and the estimated value $ZTD_A$ of the amount of zenith troposphere delay in point A, troposphere delay of a satellite positioning signal is corrected by this amount of troposphere delay of the satellite positioning signal, the SBAS message format is used for correction information.

The present invention provides a correcting method about troposphere delay of a satellite positioning signal comprised from:

two or more amendment areas which satisfy the same weather condition in a service area is set up by an entrepreneur, in this amendment area, point A and at least one reference point B which offers the correction information of the amount of zenith troposphere delay are set up, the estimated value $ZTD_B$ of the amount of zenith troposphere delay in this reference point B is calculated, the difference of the estimated value of the amount of zenith troposphere delay in reference point B and the model function $f_{ZTD}(B)$ of the amount of zenith troposphere delay in reference point B are calculated, subsequently, the difference of the estimated value of the amount of zenith troposphere delay in reference point B and the model function $f_{ZTD}(B)$ are transmitted to point A (user point) in the amendment area as correction information for calculating the estimated value of the amount of zenith troposphere delay in point A via a satellite, correction information are obtained by the user located in point A (user point) via a satellite, model function $f_{ZTD}(A)$ of the amount of zenith troposphere delay in point A is corrected by this obtained correction information, the estimated value $ZTD_A$ of the amount of zenith troposphere delay in point A is calculated by this corrected model function $f_{ZTD}(A)$ of the amount of zenith troposphere delay in point A, the satellite positioning signal from a satellite is received by the user, and the elevation angle of this received the satellite positioning signal is calculated, the amount of troposphere delay of the satellite positioning signal is calculated with the mapping function for calculating the amount of troposphere delay of a satellite positioning signal from the amount of zenith troposphere delay which makes a parameter this elevation angle of this satellite positioning signal, and the estimated value $ZTD_A$ of the amount of zenith troposphere delay in point A, troposphere delay of a satellite positioning signal is corrected by this amount of troposphere delay of the satellite positioning signal, the SBAS message format is used for correction information.

The present invention provides a correcting method of troposphere delay of a satellite positioning signal comprised from:

two or more amendment areas which satisfy the same weather condition in a service area is set up by an entrepreneur, in this amendment area, point A and at least one reference point B which offers the correction information of the amount of zenith troposphere delay are set up, the estimated value $ZTD_B$ of the amount of zenith troposphere delay in this reference point B is calculated, the information about the correction value of the amount of zenith troposphere delay in reference point B is transmitted to point A (user point) in the amendment area via a satellite, the estimated value of the amount of zenith troposphere delay in reference point B is obtained by the user located in point A (user point) via a satellite, the difference of the amount of zenith troposphere delay by the geographical conditions in point A and reference point B is calculated using model function $f_{ZTD}(A)$ of the amount of zenith troposphere delay in point A, and model function $f_{ZTD}(B)$ of the amount of zenith troposphere delay in reference point B, respectively, subsequently, obtained estimated value $ZTD_B$ of the amount of zenith troposphere delay in reference point B is corrected by the difference of the amount of zenith troposphere delay by geographical conditions with point A and reference point B, the estimated value $ZTD_A$ of the amount of zenith troposphere delay in point A is calculated by this corrected estimated value $ZTD_B$ of the amount of zenith troposphere delay in reference point B, the satellite positioning signal from a satellite is received by the user, and the elevation angle of this received the satellite positioning signal is calculated, the amount of troposphere delay of the satellite positioning signal is calculated with the mapping function for calculating the amount of troposphere delay of a satellite positioning signal from the amount of zenith troposphere delay which makes a parameter this elevation angle of this satellite positioning signal, and the estimated value $ZTD_A$ of the amount of zenith troposphere delay in point A, troposphere delay of a satellite positioning signal is corrected by this amount of troposphere delay of the satellite positioning signal, when two or more reference points B are installed, estimated value $ZTD_B$ of the amount of zenith troposphere delay in each reference point B is calculated, respectively, about two or more of these calculated estimated value of the amount of zenith troposphere delay, weight attachment is performed by the weight attachment function which consists of the distance and altitude difference of point A and each reference point B, subsequently, the one amount of zenith troposphere delay is calculated by interpolating, the estimated value of the amount of zenith troposphere delay in each reference point B is calculated in the analysis of a satellite positioning signal, into the message transmitted at once, as much estimated values or correction information of the amount of zenith troposphere delay of reference point B as possible are distributed equally and geographically, and are transmitted, the SBAS message format is used for correction information.

The present invention provides a correcting method of troposphere delay of a satellite positioning signal comprised from:

two or more amendment areas which satisfy the same weather condition in a service area is set up by an entrepreneur, in this amendment area, point A and at least one reference point B which offers the correction information of the amount of zenith troposphere delay are set up, the estimated value $ZTD_B$ of the amount of zenith troposphere delay in this reference point B is calculated, the difference of the estimated value of the amount of zenith troposphere delay in reference point B and the model function $f_{ZTD}(B)$ of the amount of zenith troposphere delay in reference point B are calculated, subsequently, the difference of the estimated value of the amount of zenith troposphere delay in reference point B and the model function $f_{ZTD}(B)$ are transmitted to point A (user point) in the amendment area as correction information for calculating the estimated value of the amount of zenith troposphere delay in point A via a satellite, correction information are obtained by the user located in point A (user point) via a satellite, model function $f_{ZTD}(A)$ of the amount of zenith troposphere delay in point A is corrected by this obtained correction information, the estimated value $ZTD_A$ of the amount of zenith troposphere delay in point A is calculated by this corrected model function $f_{ZTD}(A)$ of the amount of zenith troposphere delay in point A, the satellite positioning signal from a satellite is received by the user, and the elevation angle of this received the satellite positioning signal is calculated, the amount of troposphere delay of the satellite positioning signal is calculated with the mapping function for calculating the amount of troposphere delay of a satellite positioning signal from the amount of zenith troposphere delay which makes a parameter this elevation angle of this satellite positioning signal, and the estimated value $ZTD_A$ of the amount of zenith troposphere delay in point A, troposphere delay of a satellite positioning signal is corrected by this amount of troposphere delay of the satellite positioning signal, when two or more reference points B are installed, estimated value $ZTD_B$ of the amount of zenith troposphere delay in each reference point B is calculated, respectively, about two or more of these calculated estimated value of the amount of zenith troposphere delay, weight attachment is performed by the weight attachment function which consists of the distance and altitude difference of point A and each reference point B, subsequently, the one amount of zenith troposphere delay is calculated by interpolating, the estimated value of the amount of zenith troposphere delay in each reference point B is calculated in the analysis of a satellite positioning signal, into the message transmitted at once, as much estimated values or correction information of the amount of zenith troposphere delay of reference point B as possible are distributed equally and geographically, and are transmitted, the SBAS message format is used for correction information.

In a correcting method of troposphere delay of a satellite positioning signal according to the present invention, a correcting method of troposphere delay of a satellite positioning signal is also comprised from:

the geographical information of reference point B is had by the user in point A, which information on the version information of reference point B, the information about the creation time term of the reference point information used when creating correction information, or data showing the creation time term of the reference point information used when creating correction information is transmitted with the estimated value or correction information of the amount of zenith troposphere delay by the entrepreneur.

Effect of the Invention

The estimated value of the amount of zenith troposphere delay can be calculated about the signal which passes through the troposphere like the signal from a satellite and electromagnetic waves from the space. The estimated value of the exact amount of zenith troposphere delay in consideration of change by geographical conditions and a weather condition can be calculated. Since the estimated value of the high-precision exact amount of zenith troposphere delay is obtained by setting up at least one reference point in an amendment area, when this value is used for positioning, highly precise positioning which is not in the former can be realized.

The amount of desired information of correction information can be reduced without spoiling correction accuracy.

Moreover suitable weight attachment is carried out, two or more amounts of zenith troposphere delay are equalized, and by using the method of calculating the one amount of zenith troposphere delay, the estimated value of the amount of zenith troposphere delay and high positioning accuracy are obtained.

A positioning satellite signal can be used.

It is only receiving the first one message and highly precise positioning is possible.

Moreover, positioning accuracy can be raised whenever it receives a message one by one.

The correction message for calculating the estimated value of zenith troposphere delay can be assigned on the basis of the format of the SBAS message used by SBAS. The correction message for correcting the amount of troposphere delay of a satellite positioning signal can be assigned on the basis of the format of a SBAS message. Therefore, a design becomes easy, and it is flexible and becomes cost reduction.

Since the user can compare the reference point information on self with the reference point information received from the entrepreneur, the user can confirm the validity of the reference point information on self. Moreover, the user can also obtain information other than positioning information from an entrepreneur.

By updating own reference point information with some means (for example, data broadcasting, the Internet, etc.), if needed, the user can use the correction information about troposphere delay, even if a reference point is updated.

When it is comprised so that two or more reference points B may be installed, estimated value $ZTD_B$ of the amount of zenith troposphere delay in each reference point B may be calculated, respectively, two or more of these calculated amounts of zenith troposphere delay of each may be equalized and the one amount of zenith troposphere delay may be calculated, since the user can use two or more reference points, he can get the estimated value of the still higher-precision exact amount of zenith troposphere delay.

Since the estimated value of the amount of zenith troposphere delay from two or more reference points can be used when using for the positioning of a movable body, still highly precise positioning is realizable.

Each estimated value of the amount of zenith troposphere delay in each reference point B is calculated about each reference point B in an entrepreneur's control office, and when transmitting each of this calculated estimated value collectively, the equipment cost by the side of an entrepreneur can also be reduced further.

When calculation of the estimated value of the amount of zenith troposphere delay in each reference point B is calculated from the measurement value of the weather bulletin in a reference point, as a source of a weather bulletin, anything can be used further.

When calculation of the estimated value of the amount of zenith troposphere delay in each reference point B is calculated using the numerical weather prediction value which the Meteorological Agency provides, since it calculates using the conventional numerical weather prediction value which the user has, it is not necessary to add special operation software, and users' cost can be reduced.

Various kinds of information transmitted from an entrepreneur is equally distributed for every information transmission frequency, and when transmitting, the user can obtain necessary information by one reception.

DESCRIPTION OF NOTATIONS

A: Point (user point)
B: Reference point

BEST MODE OF CARRYING OUT THE INVENTION

An entrepreneur sets up two or more amendment areas which satisfy the same weather condition in a self service area, in this amendment area, point A and at least one reference point B which offers the correction information of the amount of zenith troposphere delay are set up, estimated value $ZTD_B$ of the amount of zenith troposphere delay in this reference point B is calculated, the estimated value of the amount of zenith troposphere delay in reference point B is transmitted to point A in an amendment area (user point) via a satellite, the user located in point A (user point) obtains the estimated value of the amount of zenith troposphere delay in reference point B via a satellite, subsequently, the difference of the amount of zenith troposphere delay by the geographical conditions in point A and reference point B is calculated using model function $f_{ZTD}(A)$ of the amount of zenith troposphere delay in every point A, and model function $f_{ZTD}(B)$ of the amount of zenith troposphere delay in reference point B, estimated value $ZTD_B$ of the amount of zenith troposphere delay in obtained reference point B is corrected from the difference of the amount of zenith troposphere delay by geographical conditions with point A and reference point B, estimated value $ZTD_A$ of the amount of zenith troposphere delay in point A is calculated, a user receives the satellite positioning signal from a satellite, and the elevation angle of the received satellite positioning signal is calculated, as a function which makes a parameter the elevation angle of this satellite positioning signal, the amount of troposphere delay of a satellite positioning signal is calculated with the mapping function for calculating the amount of troposphere delay of a satellite positioning signal from the amount of zenith troposphere delay, and estimated value $ZTD_A$ of the amount of zenith troposphere delay in point A, the amount of troposphere delay of this satellite positioning signal corrects troposphere delay of a satellite positioning signal.

Embodiment 1

The 1st embodiment of this invention is explained in detail based on FIGS. 1-9.

FIGS. 1-9 show the 1st embodiment of this invention.

Figure 1:
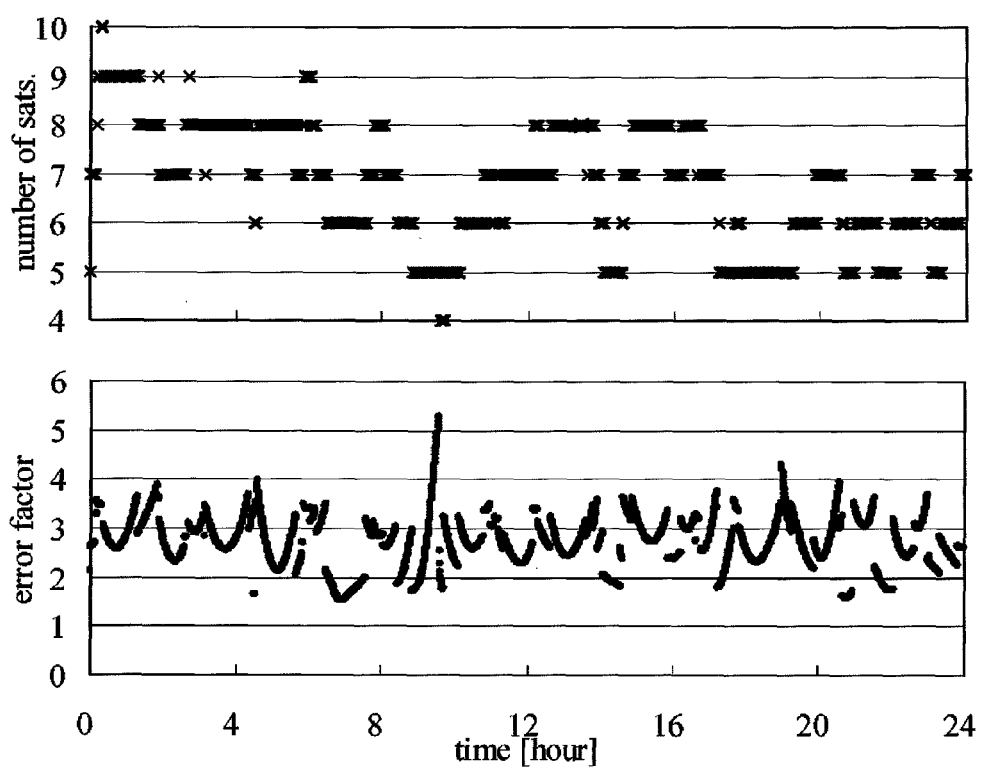
FIG. 1 is a figure for explaining this example of working of an invention, and is a figure showing the number of visible satellites of the entire day in electronic reference point 950172 (Kesennuma), and the hysteresis of error magnification.

FIG. 1 shows the history of the entire day about the number of visible satellites and error magnification in electronic reference point 950172 (Kesennuma).

Figure 2:
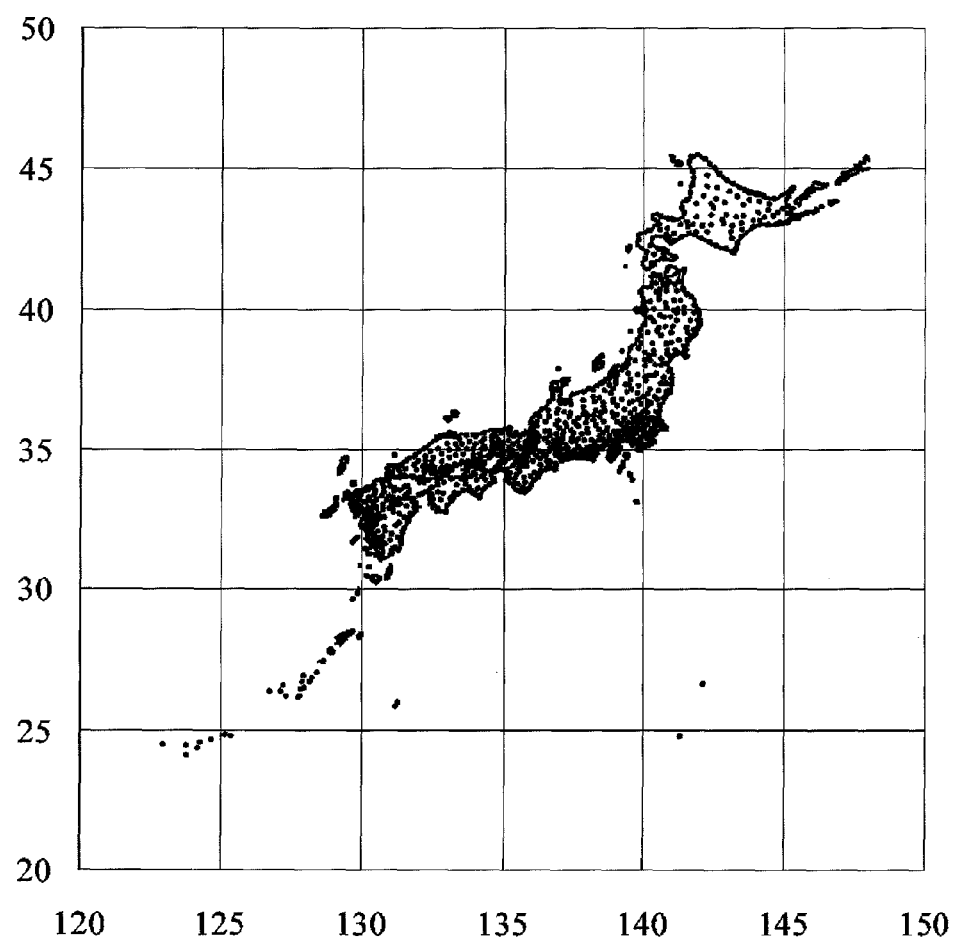
FIG. 2 is a figure for explaining this example of working of an invention, and is a figure showing the electronic reference point which estimated the amount of zenith troposphere delay.
Figure 3:
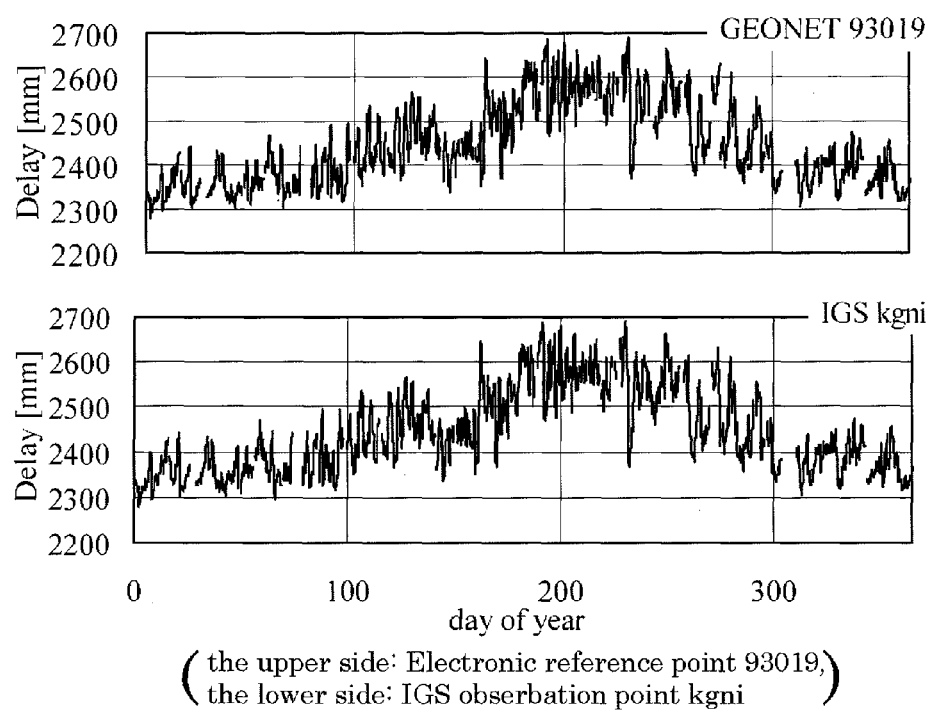
FIG. 3 is a figure for explaining this example of working of an invention, and is a figure showing the analysis output of troposphere delay.
Figures 4, 5:
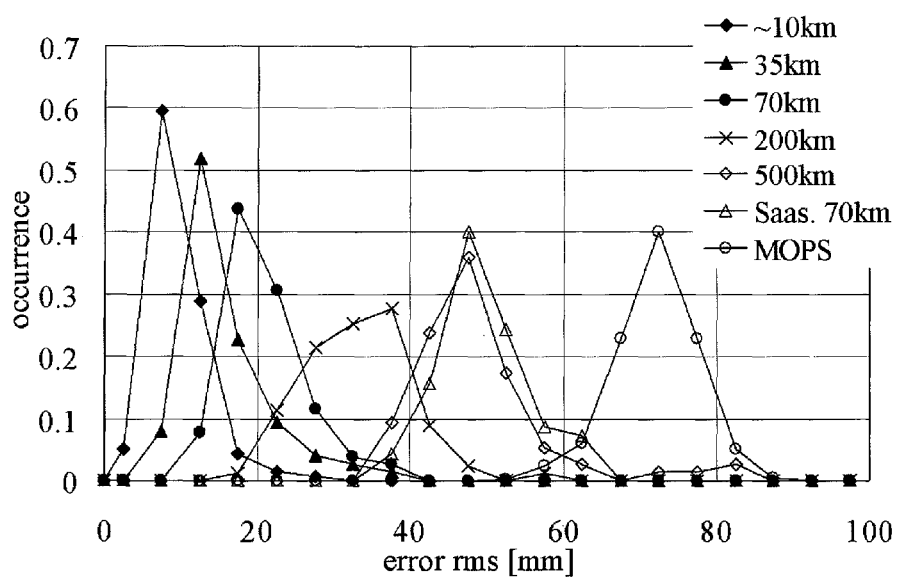
FIG. 4 is a figure for explaining this example of working of an invention, and is a figure showing evaluation of coverage.
FIG. 5 is a figure for explaining this example of working of an invention, and is a figure showing the format of a SBAS message.

FIG. 2 shows the electronic reference points which estimated the amount of zenith troposphere delay, FIG. 3 shows the analysis output of troposphere delay, and FIG. 4 shows evaluation of coverage.

FIG. 5 shows the format of an L1-SAIF message (SBAS message) mentioned later, and the format of this message is transmitted to a user as correction information using Quasi-Zenith Satellite.

Figure 6:
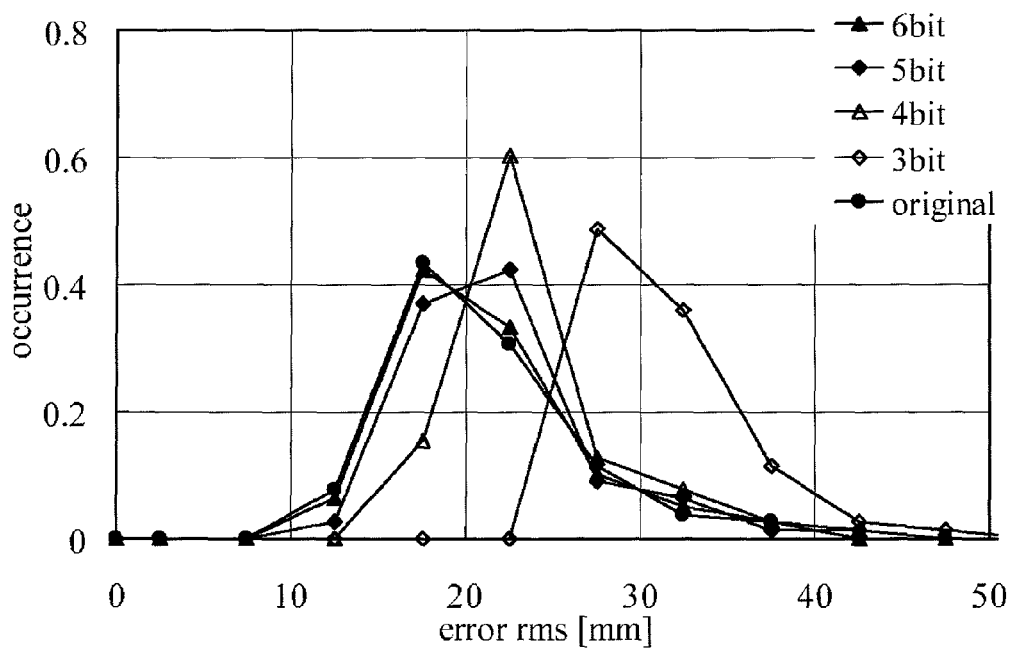
FIG. 6 is a figure for explaining this example of working of an invention, and is a figure showing error evaluation of the quantized amount of delay.
Figure 7:
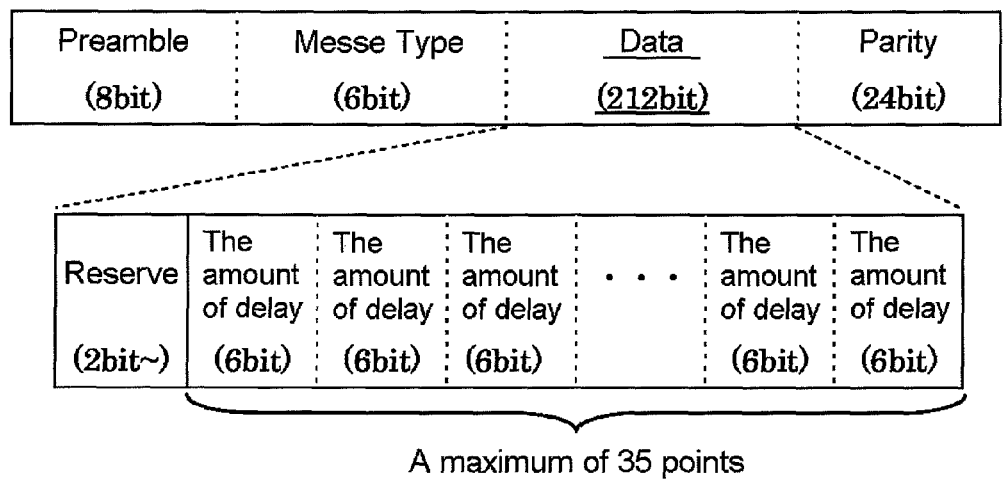
FIG. 7 is a figure for explaining this example of working of an invention, and is a figure showing the correction message for correcting troposphere delay.

FIG. 6 shows error evaluation of the quantized amount of delay, and FIG. 7 shows the correction message for correcting troposphere delay using the format of a SBAS message.

Figure 8:
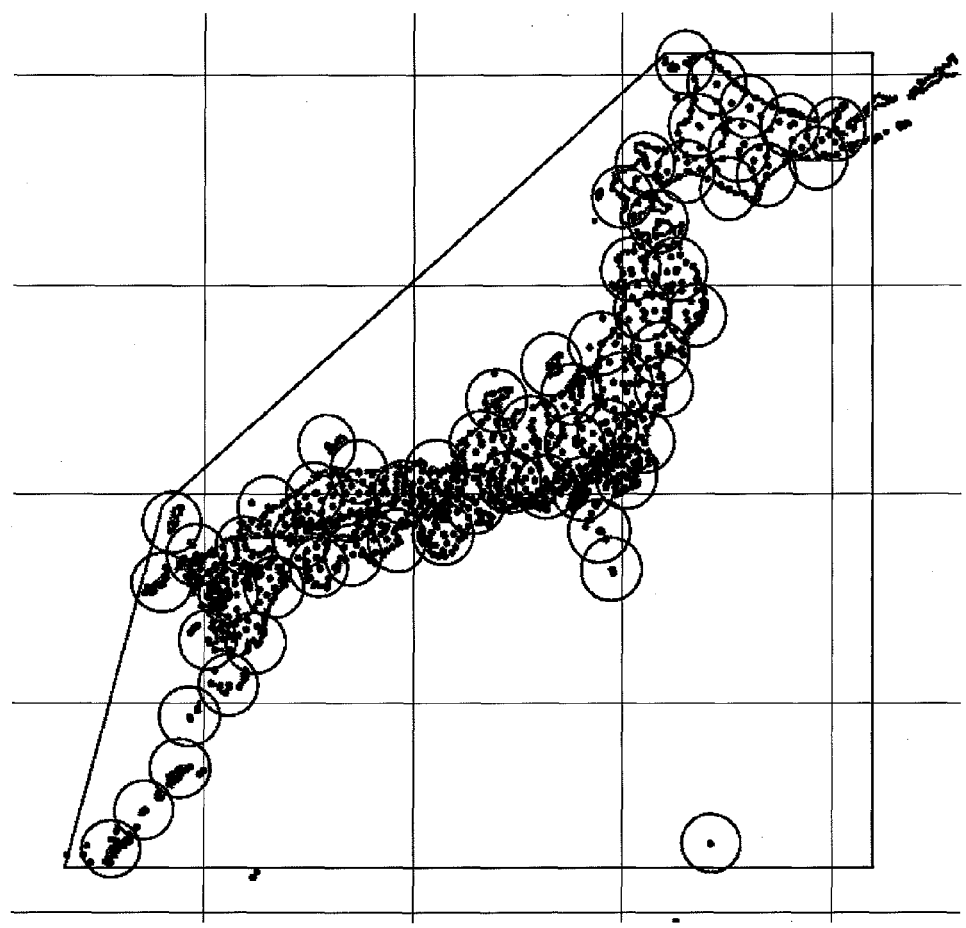
FIG. 8 is a figure for explaining this example of working of an invention, and is a figure showing the transmitting point of the amount of troposphere delay.

FIG. 8 is a figure showing the transmitting point of the amount of troposphere delay, and shows the range which can be regarded as a reference point position and a meteorological condition being almost equivalent by O mark. The black point in this O mark shows a reference point.

Figure 9:
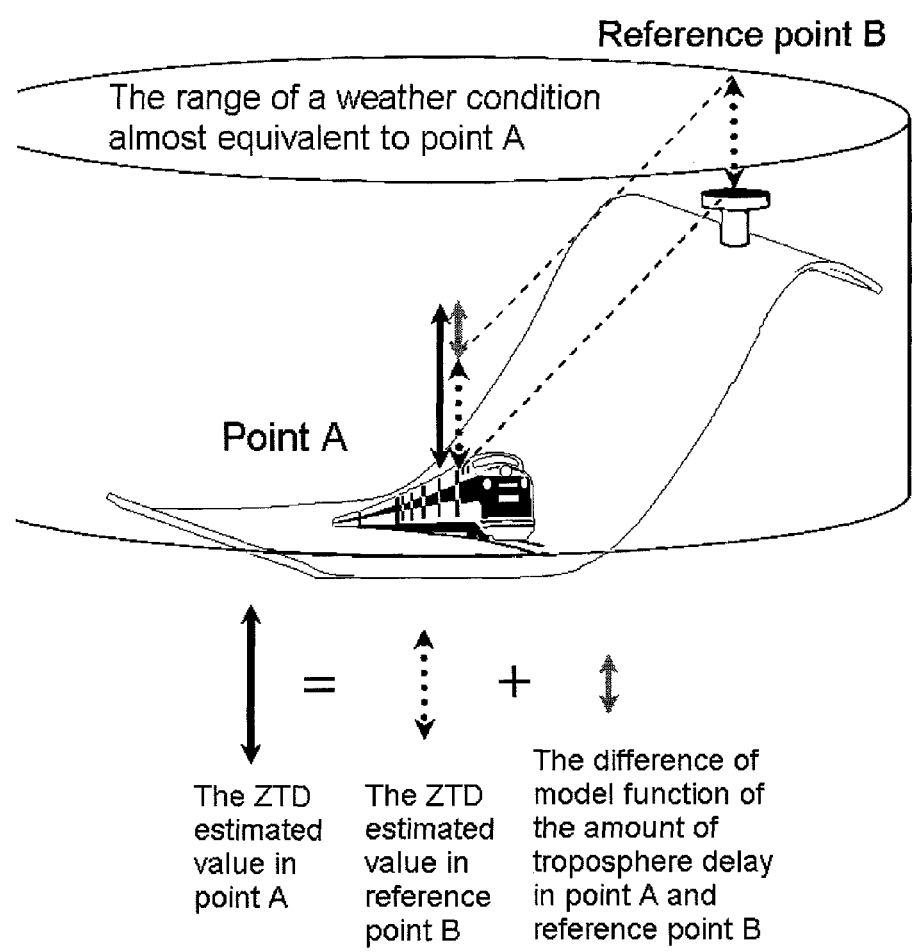
FIG. 9 is a figure for explaining this example of working of an invention, and is an explanatory diagram for obtaining the correction information of the amount of zenith troposphere delay in optional points A.

FIG. 9 is an explanatory diagram for obtaining the correction information of the amount of zenith troposphere delay at optional points.

Usually, the amount of troposphere delay of electromagnetic waves is converted in the direction of the zenith, and is analyzed and evaluated.

When actually carrying out positioning operation, the amount of zenith delay is multiplied by the coefficient (the mapping function is called.) corresponding to the elevation angle of each GPS signal.

Therefore, since a GPS signal becomes long in the distance which passes through the troposphere so that the elevation angle of a GPS Satellite becomes narrow, it is thought that an correction error will be several or more times the direction of the zenith.

Then, the inventors evaluated the influence on the positioning error by the estimated error of the amount of zenith delay of troposphere delay (it is hereafter described as the amount of zenith troposphere delay.). In this evaluation, the inventors used the data measuring in an electronic reference point (the Geographical Survey Institute is fixing.).

Subsequently, the inventors added intentionally the amount of zenith troposphere delay which is equivalent to troposphere delay in positioning operation, and compared the result of an operation before and after that.

Since the positioning error obtained as a result was proportional only to the amount of delay to add, it obtained the evaluation result as magnification of the positioning error produced to the added amount of zenith delay. Hereafter, this evaluation result is explained.

The following table 1 is the evaluation result which used the data of the 226th total day in 2004.

TABLE 1

| Reference point number | Error magnification rms | Maximum |
|---|---|---|
| 940083(Kohchi) | 2.76 | 23.39 |
| 940092(Nagasaki) | 2.84 | 5.13 |
| 950172(Kesennuma) | 2.77 | 5.30 |
| 950228(Setagaya) | 2.88 | 25.64 |
| 950490(Ibusuki) | 2.96 | 37.63 |
| 960750(Ishigaki) | 3.14 | 14.55 |
| 960760(Uji) | 2.82 | 35.56 |
| 010844(Aomori) | 2.71 | 5.02 |

FIG. 1 shows the history of the entire day about the number of visible satellites and error magnification in electronic reference point 950172 (Kesennuma), a vertical axis shows the number of visible satellites, and the horizontal axis shows time. As shown in FIG. 1, the error magnification in all the electronic datum points is averaged, it will become smaller than three times the error magnification and the maximum of this error magnification will become five times the error magnification to about ten times.

As shown in FIG. 1, change of error magnification is based on the number of visible satellites, and arrangement of a satellite. In particular, error magnification becomes the highest when the number of visible satellites is four.

The following table 2 records the evaluation result in each datum point shown in Table 1. What acting as 5 or more-time error magnification is 0.6% of the error magnification of all the evaluation objects, and what acting as 10 or more-time error magnification is 0.1%.

TABLE 2

| rms | 2.87 |
|---|---|
| 5 or more times | 0.6% |
| 10 or more times | 0.1% |

The following thing became clear from the above result. Positioning error σ only by troposphere delay became about σ=30 cm, when a MOPS model was used, and it became clear that it can be several meters in an bad condition.

When in other words the MOPS model corrected troposphere delay, it became clear that the positioning result includes the above errors potentially.

Then, the inventors thought as follows.

If the amount of zenith troposphere delay can be transmitted to a user by a certain method, when the user side uses this amount of zenith troposphere delay for the correction of a positioning signal in positioning operation, high precision positioning can be realized and the correction accuracy of a positioning signal will become almost equivalent to the estimation precision of the amount of troposphere delay.

The estimation method of the amount of troposphere delay in the analysis of the GPS network used in the field of the survey using GPS can estimate the relative position of each observation point and the amount of zenith troposphere delay with high precision by distribution/integrated processing in which many GPS observation points were used.

Under the present circumstances, if precise off-line analysis is performed, it is possible to also estimate the amount of troposphere delay with high precision.

For example, in the positioning of a movable body, the MOPS model is used by SBAS.

On the other hand, in the positioning of a movable body, since real time positioning is required as having described above, in order to realize a still highly precise positioning correction, the correction information for correcting troposphere delay is necessary for the positioning of a movable body.

Since the amount of zenith troposphere delay in an observation point can be precisely calculated by analyzing a GPS network, it is possible by using it to realize a highly precise positioning correction.

Here, as a method of correcting the amount of troposphere delay, there are a GPS network method and the weather bulletin method. The GPS network method is the method of estimating from the analysis of a GPS network. The weather bulletin method is a method of using a weather bulletin. The GPS network method is the method of correcting the amount of troposphere delay using the analysis output of a GPS network, and the weather bulletin method is the method of correcting using the weather bulletin which the Meteorological Agency offers.

In order to realize the highly precise positioning correction than before, the inventors conducted many evaluations and analysis using the GPS network method. Hereafter, this is explained.

First, the inventors used the data measuring and the precision orbital calendar in an electronic reference point of the whole country which the Geographical Survey Institute improves. And about the electronic reference point in the amendment areas, the inventors measured the amount of zenith troposphere delay for one year in 2002 with GPS analysis software Bernese, and analyzed the result.

From the analysis output, as shown in FIG. 2, the amount of zenith troposphere delay in the electronic reference point of 1000-point a little less than in whole Japan was estimated.

Here, it depends also on the altitude of the GPS observation ground for the amount of zenith troposphere delay estimated by the entrepreneur side. Therefore, the user cannot use the estimated value of the zenith troposphere delay sent by the entrepreneur as it is.

hen, the difference of the amount of zenith troposphere delay by altitude difference must be corrected by a certain method.

However, since the high slope of the amount of troposphere delay is affected by the meteorological condition of temperature, an atmospheric pressure, steam, etc. as described above, the correction with appropriate considering it as the function of only altitude difference does not become.

On the other hand, a high slope cannot be searched for from the analysis of a GPS network. In order to obtain the high slope of the amount of troposphere delay, the correction message having contained the weather bulletin has a problem of the amount of necessary message data increasing in redundant.

Then, the inventors used the MOPS model for the correction of the difference of the amount of zenith troposphere delay by altitude difference. As described above, the MOPS model is a model which made the amount of zenith troposphere delay the date, the Latitude, and a high function based on the average weather condition. Therefore, if some two points (for example, point A, the point B of FIG. 9) are the almost same weather condition by using this MOPS model, the difference of the amount of zenith troposphere delay by the altitude difference of those two points can be searched for with high precision. Hereafter, this is explained.

The following table 3 shows the weather parameter of the MOPS model.

In the MOPS model, the formula (2) and the formula (3) show change of the Latitude by the altitude, and a season. That is, the amount of zenith troposphere delay $TD_{MOPS}$ by a MOPS model is shown by the formula (1).

$$TDMOPS = d_{hyd} - d_{wet}(m) \quad (1)$$

However, $d_{hyd}$ and $d_{wet}$ are the amounts of delay by dryness atmospheric air and humid atmospheric air, respectively, and the following formula (2) and (3) show them.

TABLE 3

| | Fixed parmeter | | | | |
|---|---|---|---|---|---|
| Lat. | $P_0$ hPa | $T_0$ K | $e_0$ hPa | $\beta_0$ K/m | $\lambda_0$ |
| 15 or less | 1013.25 | 299.65 | 26.31 | 6.30e−3 | 2.77 |
| 30 | 1017.25 | 294.15 | 21.79 | 6.05e−3 | 3.15 |
| 45 | 1015.75 | 283.15 | 11.66 | 5.58e−3 | 2.57 |
| 60 | 1011.75 | 272.15 | 6.78 | 5.39e−3 | 1.81 |
| 75 or more | 1013.00 | 263.65 | 4.11 | 4.53e−3 | 1.55 |

TABLE 3-continued

| | Seasonal variation parameter | | | | |
|---|---|---|---|---|---|
| Lat. | ΔP hPa | ΔT K | Δe hPa | Δβ K/m | Δλ |
| 15 or less | 0.00 | 0.00 | 0.00 | 0.00 | 0.00 |
| 30 | −3.75 | 7.00 | 8.85 | 0.25e−3 | 0.33 |
| 45 | −2.25 | 11.00 | 7.24 | 0.32e−3 | 0.46 |
| 60 | −1.75 | 15.00 | 5.36 | 0.81e−3 | 0.74 |
| 75 or more | −0.50 | 14.50 | 3.39 | 0.62e−3 | 0.30 |

[Formula 2]

$$d_{hyd} = \left(1 - \frac{\beta H}{T}\right)^{\frac{g}{R_d \beta}} \cdot \frac{10^{-6} k_1 R_d P}{g_m} \quad (2)$$

[Formula 3]

$$d_{wet} = \left(1 - \frac{\beta H}{T}\right)^{\frac{(\lambda+1)g}{R_d \beta} - 1} \cdot \frac{10^{-6} k_2 R_d}{g_m(\lambda+1) - \beta R_d} \cdot \frac{e}{T} \quad (3)$$

However, it is $k_1$=77.604 kmbar, $k_2$=382000 $Kk^2$/mbar, $R_d$=287.54 (J/kg/K),
$g_m$=9.784 (m/s$^2$), and g=9.80665 (m/s$^2$), and H (m) shows the altitude.

Other parameters are defined by the formula (4).
The formula (4) is shown on behalf of all the variables for convenience using

[Formula 4]

$$\xi(\phi, D) = \xi_0(\phi) - \Delta\xi(\phi) \cdot \cos\left(\frac{2\pi(D - D\min)}{365.25}\right) \quad (4)$$

However, in a formula (4), $\xi_0(\phi)$ and $\Delta\xi(\phi)$ are values obtained by carrying out linear interpolation of the value shown in Table 3 according to the Latitude, respectively.

D is a julian date, and it is defined as $D_{min}$=28 in the Northern Hemisphere, and is defined as $D_{min}$=211 in the Southern Hemisphere.

Thus, in the MOPS model, the formula (2) and the formula (3) can show the difference of the amount of delay of the direction of the zenith by the altitude (the amount of zenith troposphere delay), and the formula (4) can show change of the Latitude and a season.

Here, in a certain electronic reference point, the value which corrected the estimated value of the amount of zenith troposphere delay about altitude is a correction value, and the electronic reference point which offers the information about the amount of troposphere delay is reference point B (point B). When it considers that other different electronic reference points are users and is user point A (point A), the amount correction value $TD^u$ of delay in this user point A is shown by the formula (5) mentioned later.

Next, the inventors evaluated about the analysis output by Bernese used by the GPS network method. IGS (International GNSS Service: IGS) estimates the amount of troposphere delay in the GPS observation point of 300 or more points in the world in the accuracy about 3-6 mm (rms).

Then, the inventors compared with the analysis output of IGS about the IGS observation point in Japan, and the electronic reference point in the neighborhood. The result was able to confirm the analytic accuracy of the electronic reference point by Bernese. The result is shown in Table 4.

TABLE 4

| IGS Obserbation point | Electronic reference point | rms (mm) |
|---|---|---|
| kgni | 93019 | 11.9 |
| ksmv | 93009 | 10.4 |
| mtka | 950228 | 14.2 |
| usud | 950272 | 13.2 |
| mizu | 970796 | 12.2 |
| All points | | 12.3 |

FIG. 3 shows the analysis output of the amount of troposphere delay for one year of IGS observation point kgni and electronic reference point 93019. In the compared all points, it is almost the same as that of the analysis output of the amount of troposphere delay by IGS with the difference about 1 cm (rms) so that clearly also from FIG. 3. Therefore, it became clear that the analysis output of Bernese was reliable within 1.2 cm (rms).

As stated above, based on the above-mentioned evaluation and analysis output, the inventors evaluated the coverage of the correction message using the GPS network method. Subsequently, the inventor s evaluated the amount of data which does not spoil correction accuracy, and the transmitting mark of the correction information in an amendment area (experiment area). Based on this result, the inventors created the realizable correction message. This correction message is transmitted to a user via a satellite etc. Hereafter, this is explained.

As for a user, in actual kinematic positioning, it is common to perform positioning in the position distant from the electronic reference point. In order to reduce of the amount of data of a necessary message, it is not appropriate that an entrepreneur offers the information on the amount of troposphere delay about the all points of an electronic reference point as correction information. The electronic reference point which offers correction information must give a certain amount of interval, and must choose it appropriately.

Then, the inventors performed as follows, in order to find out the maximum of the distance between the reference point (point B) which can avoid the remarkable fall of correction accuracy, and a user point (point A).

That is, the distance between reference point B and user point A chose combination which is set to less than 10 km, about 20 km, about 35 km, about 50 km, about 70 km, about 100 km, about 200 km, and about 500 km.

And about 100 sets were chosen about each combination. And about each combination, height correction with a formula (5) was performed, respectively, and it compared, respectively. This result is shown in FIG. 4.

FIG. 4 shows the evaluation result (Saas.70 km) by the MOPS model and the weather bulletin method. The distance between reference point B and user point A omitted the evaluation result for about 20 km and about 50 km.

If the distance from a reference point becomes long as shown in FIG. 4, correction information will drop. When especially correction information exceeded 70 km, it became clear that it drops remarkably. Even if it was the place 500 km away from the reference point, the correction accuracy more than a MOPS model was obtained. It became clear that correction accuracy almost equivalent to the weather bulletin method was obtained.

From the above result, it is appropriate to make the range of 70 km into a maximum from reference point B. And the correction accuracy is below 20 mm (rms), and we decided to create an correction message on the basis of this correction accuracy.

Based on an evaluation result, special consideration, etc. which were described above, a user receives the satellite positioning signal from a positioning satellite, and performs positioning of user point A (point A). And the estimated value of the amount of zenith troposphere delay in user point A (point A) is calculated, and the correcting method of troposphere delay of the satellite positioning signal which the user received is explained in detail using the estimated value of this calculated amount of zenith troposphere delay.

FIGS. 8-9 are referred to.

First, an entrepreneur sets up two or more amendment areas which satisfy the same weather condition in a service area. In this amendment area, at least one reference point B which offers the correction information of the amount of zenith troposphere delay is set up. In this amendment area, optional points A (user point A) which are the targets of an correction, and reference point B are located.

Many reference points B may be located densely, without being limited by one place in an amendment area. In this case, the higher-precision amount of troposphere delay can be obtained.

Many electronic reference points are set up in all parts of Japan. So, in this embodiment, as that example, as shown in FIG. 8, according to the above-mentioned evaluation result, the distance to a nearby electronic reference point from optional points has chosen and located the reference point from the electronic reference point in the position of 70 km.

In the Japan whole country, if the electronic reference point of 63 points is chosen as a reference point and located, it will become realizable.

First, based on FIG. 9, the calculation method of the estimated value of the amount of zenith troposphere delay in user point A (point A) is explained. Subsequently, the correcting method of troposphere delay of the satellite positioning signal which the user received is explained in detail using the estimated value of this calculated amount of zenith troposphere delay.

One reference point in these 63 reference points is made into reference point B, and the user is located in user point A (point A) in the same amendment area where this reference point B exists.

First, an entrepreneur calculates the estimated value of the amount of zenith troposphere delay in each reference point. For example, estimated value $ZTD_B$ of the amount of zenith troposphere delay in reference point B is calculated. In this embodiment, calculation of estimated value $ZTD_B$ of the amount of zenith troposphere delay is performed by analyzing the satellite positioning signal received from the satellite (not shown) in reference point B.

Calculation of the estimated value of the amount of zenith troposphere delay in a reference point may be performed in reference point B, and may be performed collectively in the control office which the entrepreneur prepared. The entrepreneur can also calculate the estimated value of this amount of zenith troposphere delay in the analysis of a satellite positioning signal. The entrepreneur can also calculate the estimated value of this amount of zenith troposphere delay using the measurement value (for example, the measured value by instrument shelter etc. is sufficient.) in consideration of the weather condition in a reference point. The entrepreneur can also calculate the estimated value of this amount of zenith troposphere delay using the numerical weather prediction value which the Meteorological Agency etc. offers.

Subsequently, an entrepreneur transmits the estimated value of the amount of zenith troposphere delay in each reference point to a user via Quasi-Zenith Satellite as correction information of the high precision positioning for the improvement in positioning accuracy of a user.

The message which transmits such high precision positioning correction information is called L1-SAIF (L1 Sub-meter class Augmentation with Integrity Function). The L1-SAIF message format is the same as that of a SBAS message format. This SBAS message format is provided in the specification document of SBAS.

This specification document of SBAS is "RTCA:Minimum Operational Performance Standards for Global Positioning System/Wide Area Augmentation System Airborne Equipment, RTCA/DO-229C, and 2001."

This SBAS message format is shown in FIG. 5. This message is based on the format used by SBAS. And one of correction information is transmitted for every second by the message which consists of 250 bits.

As shown in FIG. 5, 38 bits of one message are used for discernment of a message, or an error correction, and 212 bits which remains are assigned to an correction message.

In the present schedule, the correction message of the amount of troposphere delay is to assign one message per minute.

Since the correction of the troposphere delay performed on real time is taken in for the first time in the high precision positioning correction art in which Quasi-Zenith Satellite was used, it newly needs to design a message. Since this message is a message for the correction of kinematic positioning, a user demands acquisition of sufficient correction information after a positioning start as promptly as possible. For that purpose, it is required that the amount of necessary messages should be minimized, without an correction message spoiling correction accuracy.

Therefore, correction information has the biggest possible spatial interval so that correction accuracy may not be spoiled, and it needs to design it so that the necessary amount of data per reference point may decrease as much as possible.

According to the analysis output using old data measuring, the amount of zenith troposphere delay in each reference point is 3*m* or less. And it decreases as the altitude becomes high. In Japan, the amount of zenith troposphere delay is about a little less than 2 m.

In order not to degrade correction accuracy, reducing the necessary amount of data, it is effective to minimize the range of the estimated value of the amount of zenith troposphere delay which an correction message expresses.

Then, inventors determined that the difference of the estimated value of the amount of zenith troposphere delay and MOPS model in each reference point will transmit as correction information, without transmitting the estimated value of the amount of zenith troposphere delay of each reference point. Therefore, the average seasonal change which is an advantage of a MOPS model can be expressed. Moreover, the range of the estimated value which an correction message expresses can be narrowed further.

In order to mount as correction information, it is necessary to quantize the information on the estimated value of the amount of zenith troposphere delay. However, correction accuracy falls according to the quantization error accompanying quantization. A quantization error can be reduced if there is naturally much amount of data per point.

However, on the other hand, the necessary amount of data will increase. Then, inventors estimated the range of the quantization which an error does not increase rapidly.

Here, the difference of the amount of zenith troposphere delay in a certain reference point and the MOPS model according to its Latitude, altitude, and date was quantized at 3-8 bits to f 320 mm, respectively. Subsequently, height correction in user point A (point A) was performed, and the obtained correction value was compared with the estimated value in user point A obtained in analysis.

The distance of user point A (point A) and reference point B evaluated about the combination set to 70 km. The evaluation result is shown in FIG. 6 as rms distribution with error.

As shown in FIG. 6, when it was 6-bit quantization, it became clear to maintain accuracy almost equivalent before quantizing. Since it was mostly coincidence with the distribution before quantizing, 7-bit distribution and 8-bit distribution were omitted.

The following thing became clear by the above-mentioned evaluation result. That is, the difference of the amount of zenith troposphere delay in an electronic reference point and the MOPS model in this point is transmitted by 6-bit quantization. As a result, the amount of necessary transmit data can be minimized, without spoiling correction accuracy mostly.

An example of this correction information is shown in FIG. 7. The estimated value of the amount of zenith troposphere delay of one electronic reference point should just transmit at 6 bits. Therefore, the correction information up to 35 points is storable in one message.

Data of 2-bits or more can be used as a reserve. This 2-bit area can assign the information on the reliability of the estimated value of the amount of zenith troposphere delay, that information which cannot perform whether this estimated value can be used, and error information.

As this SBAS message was described above, assignment of about one message is assumed in 1 minute. In this embodiment, since the electronic reference point of 63 points is located in whole Japan, the user who is present in the optional places in Japan can obtain all the correction information within 2 minutes.

Since this SBAS message had limitation of the amount of information, as described above, the amount of data was made small by 6-bit quantization. In order to transmit the estimated value of the amount of zenith troposphere delay in each electronic reference point to a user, it may carry out using data broadcasting, such as the Internet, an FM multiplex broadcast, and 1 segment broadcast, without using a satellite. By doing in this way, it is possible to lose restriction of the amount of information and for the fall of the correction accuracy by a quantization error to be disregarded.

A user receives the SBAS message which stored this made correction information. This SBAS message that received stores the difference of the estimated value of the amount of zenith troposphere delay and MOPS model in each reference point. Then, a user calculates the estimated value of the amount of zenith troposphere delay of reference point B which is the same weather condition as user point A (point A). Subsequently, a user calculates the difference of the estimated value of the amount of zenith troposphere delay of this reference point B, and a MOPS model. From this difference, a user calculates the estimated value of the amount of zenith troposphere delay in user point A.

A model function is used for calculation in the estimated value of this amount of zenith troposphere delay. There are many kinds of these model functions. In this embodiment, as described above, the difference of the estimated value of the amount of zenith troposphere delay and a MOPS model is transmitted as an correction message. The model function uses the MOPS model so that clearly also from this.

Here, the estimated value of the amount of zenith troposphere delay in user point A (point A) is calculable with the following formula.

$$ZTD_A = ZTD_B + f_{ZTD}(A) - f_{ZTD}(B) \quad (5)$$

In formula (5), $ZTD_A$ is an estimated value of the amount of zenith troposphere delay in a user point (point A), $ZTD_B$ is the estimated value of the amount of zenith troposphere delay in reference point B, and $f_{ZTD}$ is a model function of the amount of zenith troposphere delay.

Here, a user receives the estimated value of the amount of zenith troposphere delay in reference point B (it is in the same weather condition as point A in which a user is present.) stored in the SBAS message.

The difference of the estimated value of the amount of zenith troposphere delay of this reference point B and a MOPS model is $ZTD_B - f_{ZTD}(B)$.

Then, if model function $f_{ZTD}(A)$ of the amount of zenith troposphere delay in user point A (point A) is added to this $ZTD_B - f_{ZTD}(B)$, estimated value $ZTD_A$ of the amount of zenith troposphere delay in point A in which a user is present is easily calculable.

When there are two or more reference points in the same weather condition as user point A (point A), the value of two or more $ZTD_B$ can be obtained about each reference point. If weight attachment is performed according to the distance and altitude difference to each reference point and the one amount of zenith troposphere delay in user point A (point A) is subsequently calculated, it is also possible to obtain the estimated value of the one amount of zenith troposphere delay of higher accuracy.

That is, when two or more reference points B which are the same weather condition as a user point (point A) are being installed, the estimated value ($ZTD_B$) of the amount of zenith troposphere delay in each reference point B is calculated, respectively. The estimated value ($ZTD_B$) of two or more amounts of zenith troposphere delay calculated, respectively, is equalized simply, and the estimated value of the one amount of zenith troposphere delay is calculated. In this case, it is also possible to obtain the estimated value of the one amount of zenith troposphere delay of higher accuracy.

When two or more reference points B which are the same weather condition as a user point (point A) are being installed, the number to 1–n is attached about two or more reference points B, respectively. First, each amount of zenith troposphere delay in each reference point is interpolation by following formula (7)-(8). Next, the function which consists of distance r between point A and reference point B, and altitude difference Δh of point A and reference point B performs weight attachment. Thus, the estimated value of the one amount of zenith troposphere delay is calculated.

[Formula 7]

$$ZTD_A^1 = a(f_I(r_1, \Delta h_1) ZTD_A^1 + f_I(r_2, \Delta h_2) ZTD_A^2 + \ldots f_I(r_n, \Delta h_n) ZTD_A^n) \quad (7)$$

[Formula 8]

$$a = 1/(f_I(r_1, \Delta h_1) + f_I(r_2, \Delta h_2) + \ldots f_I(r_n, \Delta h_n)) \quad (8)$$

However, each numeral is as follows.

a: The coefficient for adjusting so that the sum total of weight attachment may be set to 1.

$ZTD_A^{1-n}$: The amount of zenith troposphere delay in user point A (point A) obtained using reference point 1–n.

$ZTD_A^1$: The amount of zenith troposphere delay in user point A (point A) obtained by interpolation.

I: The subscript of interpolation.

$f_I(r, \Delta h)$: The weight attachment function which consists of distance r between user point A (point A) and reference point B, and altitude difference Δh.

Weight attachment functions may be optional functions. However, if distance r between user point A (point A) and reference point B and altitude difference Δh become large, the function will be a function which becomes small. As a formula which satisfies such conditions, there are a following formula (9)-a formula (12), for example. However, α, β and b, c, and d are the real numbers it was determined that became suitable weight attachment.

[Formula 9]

$$f_I(r, \Delta h) = \frac{1}{r^\alpha} \quad (9)$$

[Formula 10]

$$f_I(r, \Delta h) = \frac{1}{(|\Delta h| + b)^\beta} \quad (10)$$

[Formula 11]

$$f_I(r, \Delta h) = \frac{c}{r^\alpha} + \frac{d}{(|\Delta h| + b)^\beta} \quad (11)$$

[Formula 12]

$$f_I(r, \Delta h) = \frac{c}{r^\alpha} \times \frac{d}{(|\Delta h| + b)^\beta} \quad (12)$$

Of course, it is also possible to transmit the estimated value of the amount of zenith troposphere delay in reference point B itself to a user as correction information. However, since the amount of data increases, it has not adopted in this embodiment.

Generally, when a user performs positioning of point A in which he is present, the user needs to receive the satellite positioning signal from four or more positioning satellites.

If the positioning signal from a positioning satellite is correctly calculable by correcting troposphere delay of this (four or more) satellite positioning signal, highly precise positioning will also become realizable. However, the user has to have the geographical information and the model function of a reference point beforehand.

Then, the user can correct troposphere delay of the satellite positioning signal from each (four or more) satellite using the estimated value of the amount of zenith troposphere delay in this one point A. By multiplying the estimated value of the amount of zenith troposphere delay in calculated point A by a mapping function, the user can calculate the amount of troposphere delay of each satellite. A mapping function is a coefficient corresponding to the elevation angle of the satellite positioning signal from each satellite.

Although there are many kinds of these mapping functions, the easiest mapping function in it is shown in the following formula (6).

$$(1 - /\sin \phi) \quad (6)$$

Thus, using the estimated value of the amount of zenith troposphere delay in one point A, the user can correct the amount of troposphere delay of each (four or more) satellite positioning signal, and can realize highly precise positioning.

Correction information is made according to reference point information.

However, since abolition and addition of an electronic reference point are carried out periodically, when using an electronic reference point, the electronic reference point which transmits correction information is also updated. Therefore, the make time of the reference point information used when correction information was made, the data of the reference point information at that time, the version information of reference point information, etc. are inserted in an entrepreneur's transmitting message. An entrepreneur transmits this message.

Since the user can compare the reference point information on self to have with the reference point information received from the entrepreneur, he can confirm the validity of the reference point information on self to have. The user can also obtain information other than positioning information from an entrepreneur.

Then, if the reference point information which self has with some means (for example, data broadcasting, the Internet, etc.) if needed is updated, the user can use the correction information about troposphere delay, even if a reference point is updated. As data of the making time of reference point information used at the time of making of correction information, the GPS week number of the day which defined reference point information can be considered.

INDUSTRIAL APPLICABILITY

The calculation method of the estimated value of the amount of zenith troposphere delay and the correcting method of troposphere delay by this invention can obtain highly precise positioning accuracy on real time. Therefore, this invention can be used for a positioning system, a guidance system, etc. of a movable body.

The invention claimed is:

1. A calculation method of determining an estimated value of the amount of zenith troposphere delay comprising:
two or more amendment areas which satisfy the same weather condition in a service area is set up by an entrepreneur,
in this amendment area, point A and at least one reference point B which offers correction information of the amount of zenith troposphere delay to be used by a user located in point A (user point) are set up,
an estimated value $ZTD_B$ of said amount of zenith troposphere delay in this reference point B is calculated,
a difference between the estimated value of the amount of zenith troposphere delay in said reference point B and a MOPS model function $f_{ZTD}(B)$ of the amount of zenith troposphere delay in reference point B is calculated,
subsequently, the difference between the estimated value of the amount of zenith troposphere delay in said reference point B and said model function $f_{ZTD}(B)$ of the amount of the amount of zenith troposphere delay in reference point B is transmitted to said point A (user point) in said amendment area as correction information for calculating the estimated value of the amount of zenith troposphere delay in point A,
said correction information are obtained by the user located in point A (user point),
a model function $f_{ZTD}(A)$ of the amount of zenith troposphere delay in point A is corrected by this obtained correction information,
an estimated value $ZTD_A$ of the amount of zenith troposphere delay in said point A to be used by the user located in point A (user point) is calculated by this corrected model function $f_{ZTD}(A)$ of the amount of zenith troposphere delay in point A,
when two or more said reference points B are installed, estimated value $ZTD_B$ of the amount of zenith troposphere delay in each reference point B is calculated, respectively,
two or more of these calculated estimated value of the amount of zenith troposphere delay, weight attachment is performed by the weight attachment function which consists of the distance and altitude difference of said point A and said each reference point B, and
subsequently, the one amount of zenith troposphere delay is calculated by interpolating.

2. A correcting method of determining a troposphere delay of a satellite positioning signal comprising:
two or more amendment areas which satisfy the same weather condition in a service area is set up by an entrepreneur,
in this amendment area, point A and at least one reference point B which offers correction information of the amount of zenith troposphere delay to be used by a user located in point A (user point) are set up,
an estimated value $ZTD_B$ of said amount of zenith troposphere delay in this reference point B is calculated,
information about a correction value of the amount of zenith troposphere delay in said reference point B including said estimated value $ZTD_B$ is transmitted to said point A (user point) in said amendment area,
the estimated value of the amount of zenith troposphere delay in said reference point B is obtained by the user located in said point A (user point),
a difference of the amount of zenith troposphere delay by the geographical conditions in said point A and said reference point B is calculated using a model function $f_{ZTD}(A)$ of the amount of zenith troposphere delay in said point A, and a model function $f_{ZTD}(B)$ of the amount of zenith troposphere delay in reference point B, respectively,
subsequently, obtained estimated value $ZTD_B$ of the amount of zenith troposphere delay in reference point B is corrected by the difference of the amount of zenith troposphere delay by geographical conditions with point A and reference point B,
an estimated value $ZTD_A$ of the amount of zenith troposphere delay in said point A is calculated by this corrected estimated value $ZTD_B$ of the amount of zenith troposphere delay in reference point B,
the satellite positioning signal from a satellite is received by the user, and the elevation angle of this received said satellite positioning signal is calculated,
the amount of troposphere delay of said satellite positioning signal is calculated with the mapping function for calculating the amount of troposphere delay of a satellite positioning signal from the amount of zenith troposphere delay which regards this elevation angle of the satellite positioning signal as a parameter, and said estimated value $ZTD_A$ of the amount of zenith troposphere delay in said point A,
troposphere delay of a satellite positioning signal is corrected by this amount of troposphere delay of the satellite positioning signal, when two or more said reference points B are installed, estimated value $ZTD_B$ of the amount of zenith troposphere delay in each reference point B is calculated, respectively, two or more of these calculated estimated value of the amount of zenith troposphere delay, weight attachment is performed by the weight attachment function which consists of the distance and altitude difference of said point A and said each reference point B, subsequently, the one amount of zenith troposphere delay is calculated by interpolating.

3. A correcting method of determining a troposphere delay of a satellite positioning signal comprising:

two or more amendment areas which satisfy the same weather condition in a service area is set up by an entrepreneur, in this amendment area, point A and at least one reference point B which offers correction information of the amount of zenith troposphere delay to be used by a user located in point A (user point) are set up, an estimated value $ZTD_B$ of said amount of zenith troposphere delay in this reference point B is calculated, the information about the correction value of the amount of zenith troposphere delay in said reference point B including said estimated value $ZTD_B$, is transmitted to point A (user point) in said amendment area via a satellite, the estimated value of the amount of zenith troposphere delay in said reference point B is obtained by the user located in said point A (user point) via a satellite, a difference of the amount of zenith troposphere delay by the geographical conditions in said point A and said reference point B is calculated using model function $f_{ZTD}(A)$ of the amount of zenith troposphere delay in said point A, and model function $f_{ZTD}(B)$ of the amount of zenith troposphere delay in reference point B, respectively, subsequently, obtained estimated value $ZTD_B$ of the amount of zenith troposphere delay in reference point B is corrected by the difference of the amount of zenith troposphere delay by geographical conditions with point A and reference point B, an estimated value $ZTD_A$ of the amount of zenith troposphere delay in said point A is calculated by this corrected estimated value $ZTD_B$ of the amount of zenith troposphere delay in reference point B, the satellite positioning signal from a satellite is received by the user, and the elevation angle of this received said satellite positioning signal is calculated, the amount of troposphere delay of said satellite positioning signal is calculated with the mapping function for calculating the amount of troposphere delay of a satellite positioning signal from the amount of zenith troposphere delay which regards this elevation angle of the satellite positioning signal as a parameter, and said estimated value $ZTD_A$ of the amount of zenith troposphere delay in said point A, troposphere delay of a satellite positioning signal is corrected by this amount of troposphere delay of the satellite positioning signal, when two or more said reference points B are installed, estimated value $ZTD_B$ of the amount of zenith troposphere delay in each reference point B is calculated, respectively, two or more of these calculated estimated value of the amount of zenith troposphere delay, weight attachment is performed by the weight attachment function which consists of the distance and altitude difference of said point A and said each reference point B, subsequently, the one amount of zenith troposphere delay is calculated by interpolating.

4. A correcting method of determining a troposphere delay of a satellite positioning signal comprising:

two or more amendment areas which satisfy the same weather condition in a service area is set up by an entrepreneur, in this amendment area, point A and at least one reference point B which offers correction information of the amount of zenith troposphere delay to be used by a user located in point A (user point) are set up, an estimated value $ZTD_B$ of said amount of zenith troposphere delay in this reference point B is calculated, a difference between the estimated value of the amount of zenith troposphere delay in said reference point B and a MOPS model function $f_{ZTD}(B)$ of the amount of zenith troposphere delay in reference point B is calculated, subsequently, the difference between the estimated value of the amount of zenith troposphere delay in said reference point B and said model function $f_{ZTD}(B)$ of the amount of zenith troposphere delay in reference point B is transmitted to said point A (user point) in said amendment area as correction information for calculating the estimated value of the amount of zenith troposphere delay in point A via a satellite, said correction information are obtained by the user located in said point A (user point) via a satellite, model function $f_{ZTD}(A)$ of the amount of zenith troposphere delay in said point A is corrected by this obtained correction information, an estimated value $ZTD_A$ of the amount of zenith troposphere delay in said point A to be used by the user located in said point A (user point) is calculated by this corrected model function $f_{ZTD}(A)$ of the amount of zenith troposphere delay in said point A, the satellite positioning signal from a satellite is received by the user, and the elevation angle of this received said satellite positioning signal is calculated, the amount of troposphere delay of said satellite positioning signal is calculated with the mapping function for calculating the amount of troposphere delay of a satellite positioning signal from the amount of zenith troposphere delay which regards this elevation angle of the satellite positioning signal as a parameter, and said estimated value $ZTD_A$ of the amount of zenith troposphere delay in said point A, troposphere delay of a satellite positioning signal is corrected by this amount of troposphere delay of the satellite positioning signal, when two or more said reference points B are installed, estimated value $ZTD_B$ of the amount of zenith troposphere delay in each reference point B is calculated, respectively, two or more of these calculated estimated value of the amount of zenith troposphere delay, weight attachment is performed by the weight attachment function which consists of the distance and altitude difference of said point A and said each reference point B, subsequently, the one amount of zenith troposphere delay is calculated by interpolating.

5. A correcting method of determining a troposphere delay of a satellite positioning signal comprising:

two or more amendment areas which satisfy the same weather condition in a service area is set up by an entrepreneur, in this amendment area, point A and at least one reference point B which offers correction information of the amount of zenith troposphere delay to be used by a user located in point A (user point) are set up, an estimated value $ZTD_B$ of said amount of zenith troposphere delay in this reference point B is calculated, the information about the correction value of the amount of zenith troposphere delay in said reference point B including said estimated value $ZTD_B$ is transmitted to said point A (user point) in said amendment area via a satellite, the estimated value of the amount of zenith troposphere delay in said reference point B is obtained by the user located in said point A (user point) via a satellite, a difference of the amount of zenith troposphere delay by the geographical conditions in said point A and said reference point B is calculated using model function $f_{ZTD}(A)$ of the amount of zenith troposphere delay in said point A, and model function $f_{ZTD}(B)$ of the amount of zenith troposphere delay in reference point B, respectively, subsequently, obtained estimated value $ZTD_B$ of the amount of zenith troposphere delay in reference point B is corrected by the difference of the amount of zenith troposphere delay by geographical conditions with point A and reference point B, an estimated value $ZTD_A$ of the amount of zenith troposphere delay in said point A is calculated by this corrected estimated value $ZTD_B$ of the amount of zenith troposphere delay in reference point B, the satellite positioning signal from a satellite is received by the user, and the elevation angle of this received said satellite positioning signal is calculated, the amount of troposphere delay of said satellite positioning signal is calculated with the mapping function for calculating the amount of troposphere delay of a satellite positioning signal from the amount of zenith troposphere delay which regards this elevation angle of the satellite positioning signal as a parameter, and said estimated value $ZTD_A$ of the amount of zenith troposphere delay in said point A, troposphere delay of a satellite positioning signal is corrected by this amount of troposphere delay of the satellite positioning signal, when two or more said reference points B are installed, estimated value $ZTD_B$ of the amount of zenith troposphere delay in each reference point B is calculated, respectively, two or more of these calculated estimated value of the amount of zenith troposphere delay, weight attachment is performed by the weight attachment function which consists of the distance and altitude difference of said point A and said each reference point B, subsequently, the one amount of zenith troposphere delay is calculated by interpolating, the estimated value of said amount of zenith troposphere delay in each reference point B is calculated in the analysis of a satellite positioning signal, into the message transmitted at once, as much estimated values or correction information of the amount of zenith troposphere delay of reference point B as possible are distributed equally and geographically, and are transmitted, the SBAS message format is used for said correction information.

6. A correcting method of determining a troposphere delay of a satellite positioning signal comprising:

two or more amendment areas which satisfy the same weather condition in a service area is set up by an entrepreneur, in this amendment area, point A and at least one reference point B which offers correction information of the amount of zenith troposphere delay to be used by a user located in point A (user point) are set up, an estimated value $ZTD_B$ of said amount of zenith troposphere delay in this reference point B is calculated, a difference between the estimated value of the amount of zenith troposphere delay in said reference point B and a MOPS model function $f_{ZTD}(B)$ of the amount of zenith troposphere delay in reference point B is calculated, subsequently, the difference between the estimated value of the amount of zenith troposphere delay in said reference point B and said model function $f_{ZTD}(B)$ of the amount of zenith troposphere delay in reference point B is transmitted to said point A (user point) in said amendment area as correction information for calculating the estimated value of the amount of zenith troposphere delay in point A via a satellite, said correction information are obtained by the user located in said point A (user point) via a satellite, model function $f_{ZTD}(A)$ of the amount of zenith troposphere delay in said point A is corrected by this obtained correction information, an estimated value $ZTD_A$ of the amount of zenith troposphere delay in said point A to be used by the user located in said point A (user point) is calculated by this corrected model function $f_{ZTD}(A)$ of the amount of zenith troposphere delay in point A, the satellite positioning signal from a satellite is received by the user, and the elevation angle of this received said satellite positioning signal is calculated, the amount of troposphere delay of said satellite positioning signal is calculated with the mapping function for calculating the amount of troposphere delay of a satellite positioning signal from the amount of zenith troposphere delay which regards this elevation angle of the satellite positioning signal as a parameter, and said estimated value $ZTD_A$ of the amount of zenith troposphere delay in said point A, troposphere delay of a satellite positioning signal is corrected by this amount of troposphere delay of the satellite positioning signal, when two or more said reference points B are installed, estimated value $ZTD_B$ of the amount of zenith troposphere delay in each reference point B is calculated, respectively, two or more of these calculated estimated value of the amount of zenith troposphere delay, weight attachment is performed by the weight attachment function which consists of the distance and altitude difference of said point A and said each reference point B, subsequently, the one amount of zenith troposphere delay is calculated by interpolating, the estimated value of said amount of zenith troposphere delay in each reference point B is calculated in the analysis of a satellite positioning signal, into the message transmitted at once, as much estimated values or correction information of the amount of zenith troposphere delay of reference point B as possible are distributed equally and geographically, and are transmitted, the SBAS message format is used for said correction information.

7. The correcting method of determining a troposphere delay of a satellite positioning signal according to claim 3, claim 4, claim 5 or claim 6, wherein a correcting method of troposphere delay of a satellite positioning signal comprising:

the geographical information of reference point B is had by the user in said point A, which information on the version information of the reference point information of reference point B, the information about the creation time term of the reference point information used when creating correction information, or data showing the creation time term of the reference point information used when creating correction information is transmitted with the estimated value or correction information of the amount of zenith troposphere delay by the entrepreneur.

8. A calculation method of determining an estimated value of the amount of zenith troposphere delay comprising:

two or more amendment areas which satisfy the same weather condition in a service area is set up by an entrepreneur, in this amendment area, point A and at least one reference point B which offers correction information of the amount of zenith troposphere delay to be used by user located in point A (user point) are set up, an estimated value $ZTD_B$ of said amount of zenith troposphere delay in this reference point B is calculated, a difference between the estimated value of the amount of zenith troposphere delay in said reference point B and a MOPS model function $f_{ZTD}(B)$ of the amount of zenith troposphere delay in said reference point B is calculated, subsequently, the difference between the estimated value of the amount of zenith troposphere delay in said reference point B and said model function $f_{ZTD}(B)$ of the amount of zenith troposphere delay in said reference point B is transmitted to said point A (user point) in said amendment area as correction information for calculating the estimated value of the amount of zenith troposphere delay in said point A via a satellite, said correction information are obtained by the user located in said point A (user point) via a satellite, model function $f_{ZTD}(A)$ of the amount of zenith troposphere delay in said point A is corrected by this obtained correction information, an estimated value $ZTD_A$ of the amount of zenith troposphere delay in said point A to be used by user located in point A (user point) is calculated by this corrected model function $f_{ZTD}(A)$ of the amount of zenith troposphere delay in said point A, when two or more said reference points B are installed, estimated value $ZTD_B$ of the amount of zenith troposphere delay in each reference point B is calculated, respectively, two or more of these calculated estimated value of the amount of zenith troposphere delay, weight attachment is performed by the weight attachment function which consists of the distance and altitude difference of said point A and said each reference point B, subsequently, the one amount of zenith troposphere delay is calculated by interpolating.

9. A correcting method of determining a troposphere delay of a satellite positioning signal comprising:

two or more amendment areas which satisfy the same weather condition in a service area is set up by an entrepreneur, in this amendment area, point A and at least one reference point B which offers correction information of the amount of zenith troposphere delay to be used by user located in point A (user point) are set up, an estimated value $ZTD_B$ of said amount of zenith troposphere delay in this reference point B is calculated, a difference between the estimated value of the amount of zenith troposphere delay in said reference point B and a MOPS model function $f_{ZTD}(B)$ of the amount of zenith troposphere delay in said reference point B is calculated, subsequently, the difference between the estimated value of the amount of zenith troposphere delay in said reference point B and said model function $f_{ZTD}(B)$ of the amount of zenith troposphere delay in said reference point B is transmitted to said point A (user point) in said amendment area as correction information for calculating the estimated value of the amount of zenith troposphere delay in said point A, said correction information are obtained by the user located in point A (user point), model function $f_{ZTD}(A)$ of the amount of zenith troposphere delay in said point A is corrected by this obtained correction information, an estimated value $ZTD_A$ of the amount of zenith troposphere delay in said point A to be used by user located in said point A (user point) is calculated by this corrected model function $f_{ZTD}(A)$ of the amount of zenith troposphere delay in said point A, the satellite positioning signal from a satellite is received by the user, and the elevation angle of this received said satellite positioning signal is calculated, the amount of troposphere delay of said satellite positioning signal is calculated with the mapping function for calculating the amount of troposphere delay of a satellite positioning signal from the amount of zenith troposphere delay which regards this elevation angle of the satellite positioning signal as a parameter, and said estimated value $ZTD_A$ of the amount of zenith troposphere delay in said point A, troposphere delay of a satellite positioning signal is corrected by this amount of troposphere delay of the satellite positioning signal, when two or more said reference points B are installed, estimated value $ZTD_B$ of the amount of zenith troposphere delay in each reference point B is calculated, respectively, about two or more of these calculated estimated value of the amount of zenith troposphere delay, weight attachment is performed by the weight attachment function which consists of the distance and altitude difference of said point A and said each reference point B, subsequently, the one amount of zenith troposphere delay is calculated by interpolating.

10. A correcting method of determining a troposphere delay of a satellite positioning signal comprising:

two or more amendment areas which satisfy the same weather condition in a service area is set up by an entrepreneur, in this amendment area, point A and at least one reference point B which offers correction information of the amount of zenith troposphere delay to be used by user located in point A (user point) are set up, an estimated value $ZTD_B$ of said amount of zenith troposphere delay in this reference point B is calculated, the information about the correction value of the amount of zenith troposphere delay in said reference point B including said estimated value $ZTD_B$, is transmitted to said point A (user point) in said amendment area via a satellite, the estimated value of the amount of zenith troposphere delay in said reference point B is obtained by the user located in said point A (user point) via a satellite, a difference of the amount of zenith troposphere delay by the geographical conditions in said point A and said reference point B is calculated using model function $f_{ZTD}(A)$ of the amount of zenith troposphere delay in said point A, and model function $f_{ZTD}(B)$ of the amount of zenith troposphere delay in reference point B, respectively, subsequently, obtained estimated value $ZTD_B$ of the amount of zenith troposphere delay in said reference point B is corrected by the difference of the amount of zenith troposphere delay by geographical conditions with said point A and said reference point B, an estimated value $ZTD_A$ of the amount of zenith troposphere delay in said point A is calculated by this corrected estimated value $ZTD_B$ of the amount of zenith troposphere delay in reference point B, the satellite positioning signal from a satellite is received by the user, and the elevation angle of this received said satellite positioning signal is calculated, the amount of troposphere delay of said satellite positioning signal is calculated with the mapping function for calculating the amount of troposphere delay of a satellite positioning signal from the amount of zenith troposphere delay which regards this elevation angle of the satellite positioning signal as a parameter, and said estimated value $ZTD_A$ of the amount of zenith troposphere delay in said point A, troposphere delay of a satellite positioning signal is corrected by this amount of troposphere delay of the satellite positioning signal, the geographical information of said reference point B is had by the user in said point A, which information on the version information of the reference point information of said reference point B, the information about the creation time term of the reference point information used when creating correction information, or data showing the creation time term of the reference point information used when creating correction information is transmitted with the estimated value or correction information of the amount of zenith troposphere delay by the entrepreneur.

11. A correcting method of determining a troposphere delay of a satellite positioning signal comprising:

two or more amendment areas which satisfy the same weather condition in a service area is set up by an entrepreneur, in this amendment area, said point A and at least one reference point B which offers correction information of the amount of zenith troposphere delay to be used by user located in point A (user point) are set up, an estimated value $ZTD_B$ of said amount of zenith troposphere delay in this reference point B is calculated, a difference between the estimated value of the amount of zenith troposphere delay in said reference point B and a MOPS model function $f_{ZTD}(B)$ of the amount of zenith troposphere delay in reference point B is calculated, subsequently, the difference between the estimated value of the amount of zenith troposphere delay in said reference point B and the said model function $f_{ZTD}(B)$ of the amount of zenith troposphere delay in reference point B is transmitted to said point A (user point) in said amendment area as correction information for calculating the estimated value of the amount of zenith troposphere delay in said point A via a satellite, said correction information are obtained by the user located in said point A (user point) via a satellite, model function $f_{ZTD}(A)$ of the amount of zenith troposphere delay in point A is corrected by this obtained correction information, an estimated value $ZTD_A$ of the amount of zenith troposphere delay in said point A to be used by user located in point A (user point) is calculated by this corrected model function $f_{ZTD}(A)$ of the amount of zenith troposphere delay in said point A, the satellite positioning signal from a satellite is received by the user, and the elevation angle of this received said satellite positioning signal is calculated, the amount of troposphere delay of said satellite positioning signal is calculated with the mapping function for calculating the amount of troposphere delay of a satellite positioning signal from the amount of zenith troposphere delay which regards this elevation angle of the satellite positioning signal as a parameter, and said estimated value $ZTD_A$ of the amount of zenith troposphere delay in said point A, troposphere delay of a satellite positioning signal is corrected by this amount of troposphere delay of the satellite positioning signal, the geographical information of said reference point B is had by the user in said point A, which information on the version information of the reference point information of said reference point B, the information about the creation time term of the reference point information used when creating correction information, or data showing the creation time term of the reference point information used when creating correction information is transmitted with the estimated value or correction information of the amount of zenith troposphere delay by the entrepreneur.

12. A correcting method of determining a troposphere delay of a satellite positioning signal comprising:

two or more amendment areas which satisfy the same weather condition in a service area is set up by an entrepreneur, in this amendment area, point A and at least one reference point B which offers correction information of the amount of zenith troposphere delay to be used by user located in point A (user point) are set up, an estimated value $ZTD_B$ of said amount of zenith troposphere delay in this reference point B is calculated, the information about the correction value of the amount of zenith troposphere delay in said reference point B including said estimated value $ZTD_B$, is transmitted to point A (user point) in said amendment area via a satellite, the estimated value of the amount of zenith troposphere delay in said reference point B is obtained by the user located in said point A (user point) via a satellite, a difference of the amount of zenith troposphere delay by the geographical conditions in said point A and said reference point B is calculated using model function $f_{ZTD}(A)$ of the amount of zenith troposphere delay in said point A, and model function $f_{ZTD}(B)$ of the amount of zenith troposphere delay in reference point B, respectively, subsequently, obtained estimated value $ZTD_B$ of the amount of zenith troposphere delay in said reference point B is corrected by the difference of the amount of zenith troposphere delay by geographical conditions with said point A and said reference point B, an estimated value $ZTD_A$ of the amount of zenith troposphere delay in said point A is calculated by this corrected estimated value $ZTD_B$ of the amount of zenith troposphere delay in reference point B, the satellite positioning signal from a satellite is received by the user, and the elevation angle of this received said satellite positioning signal is calculated, the amount of troposphere delay of said satellite positioning signal is calculated with the mapping function for calculating the amount of troposphere delay of a satellite positioning signal from the amount of zenith troposphere delay which regards this elevation angle of the satellite positioning signal as a parameter, and said estimated value $ZTD_A$ of the amount of zenith troposphere delay in said point A, troposphere delay of a satellite positioning signal is corrected by this amount of troposphere delay of the satellite positioning signal, the SBAS message format is used for said correction information, the geographical information of said reference point B is had by the user in said point A, which information on the version information of the reference point information of said reference point B, the information about the creation time term of the reference point information used when creating correction information, or data showing the creation time term of the reference point information used when creating correction information is transmitted with the estimated value or correction information of the amount of zenith troposphere delay by the entrepreneur.

13. A correcting method of determining a troposphere delay of a satellite positioning signal comprising:

two or more amendment areas which satisfy the same weather condition in a service area is set up by an entrepreneur, in this amendment area, point A and at least one reference point B which offers correction information of the amount of zenith troposphere delay to be used by user located in point A (user point) are set up, an estimated value $ZTD_B$ of said amount of zenith troposphere delay in this reference point B is calculated, a difference between the estimated value of the amount of zenith troposphere delay in said reference point B and a MOPS model function $f_{ZTD}(B)$ of the amount of zenith troposphere delay in said reference point B is calculated, subsequently, the difference between the estimated value of the amount of zenith troposphere delay in said reference point B and the said model function $f_{ZTD}(B)$ of the amount of zenith troposphere delay in reference point B is transmitted to said point A (user point) in said amendment area as correction information for calculating the estimated value of the amount of zenith troposphere delay in said point A via a satellite, said correction information are obtained by the user located in said point A (user point) via a satellite, model function $f_{ZTD}(A)$ of the amount of zenith troposphere delay in said point A is corrected by this obtained correction information, the estimated value $ZTD_A$ of the amount of zenith troposphere delay in said point A to be used by user located in point A (user point) is calculated by this corrected model function $f_{ZTD}(A)$ of the amount of zenith troposphere delay in said point A, the satellite positioning signal from a satellite is received by the user, and the elevation angle of this received said satellite positioning signal is calculated, the amount of troposphere delay of said satellite positioning signal is calculated with the mapping function for calculating the amount of troposphere delay of a satellite positioning signal from the amount of zenith troposphere delay which regards this elevation angle of the satellite positioning signal as a parameter, and said estimated value $ZTD_A$ of the amount of zenith troposphere delay in said point A, troposphere delay of a satellite positioning signal is corrected by this amount of troposphere delay of the satellite positioning signal, the SBAS message format is used for said correction information, the geographical information of said reference point B is had by the user in said point A, which information on the version information of the reference point information of reference point B, the information about the creation time term of the reference point information used when creating correction information, or data showing the creation time term of the reference point information used when creating correction information is transmitted with the estimated value or correction information of the amount of zenith troposphere delay by the entrepreneur.

* * * * *